US010660157B2

(12) United States Patent
Routt

(10) Patent No.: US 10,660,157 B2
(45) Date of Patent: *May 19, 2020

(54) PUBLIC SAFETY ANALYTICS GATEWAY

(71) Applicant: AT&T Mobility II LLC, Atlanta, GA (US)

(72) Inventor: Thomas J. Routt, Edmonds, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,020

(22) Filed: Feb. 14, 2019

(65) Prior Publication Data

US 2019/0191488 A1    Jun. 20, 2019

Related U.S. Application Data

(63) Continuation of application No. 15/600,421, filed on May 19, 2017, now Pat. No. 10,244,581.

(51) Int. Cl.
| | | |
|---|---|---|
| *H04W 24/08* | (2009.01) | |
| *H04W 88/16* | (2009.01) | |
| *G06Q 50/26* | (2012.01) | |
| *G06F 16/40* | (2019.01) | |
| *G06F 16/95* | (2019.01) | |
| *H04W 24/04* | (2009.01) | |

(Continued)

(52) U.S. Cl.
CPC ........... *H04W 88/16* (2013.01); *G06F 16/40* (2019.01); *G06F 16/95* (2019.01); *G06Q 50/26* (2013.01); *H04L 41/0896* (2013.01); *H04L 41/16* (2013.01); *H04L 41/5009* (2013.01); *H04L 41/5025* (2013.01); *H04L 43/045* (2013.01); *H04L 43/08* (2013.01); *H04L 43/0876* (2013.01); *H04W 24/04* (2013.01); *H04W 24/08* (2013.01); *H04W 84/02* (2013.01)

(58) Field of Classification Search
CPC ....................................................... H04W 88/16
See application file for complete search history.

(56) References Cited

U.S. PATENT DOCUMENTS

| | | |
|---|---|---|
| 7,644,056 B2 | 1/2010 | Khalsa |
| 8,195,598 B2 | 6/2012 | Hua et al. |

(Continued)

FOREIGN PATENT DOCUMENTS

| | | |
|---|---|---|
| CN | 105022835 A | 11/2015 |
| GB | 2401752 A | 11/2004 |

(Continued)

OTHER PUBLICATIONS

Kang et al.; "A deep-learning-based emergency alert system"; ICT Express; vol. 2 Issue 2; Jun. 2016; p. 67-70.

(Continued)

*Primary Examiner* — Michael T Vu
(74) *Attorney, Agent, or Firm* — BakerHostetler

(57) ABSTRACT

A public safety analytics gateway includes a front-end processor configured to communicate with a network gateway and a public safety enterprise server and a data collector in communication with the front end processor, wherein the front end processor is configured to receive public safety data from the public service enterprise server and forward the public safety data to both the network gateway and the data collector.

14 Claims, 23 Drawing Sheets

(51) Int. Cl.
*H04L 12/24* (2006.01)
*H04L 12/26* (2006.01)
*H04W 84/02* (2009.01)

(56) References Cited

U.S. PATENT DOCUMENTS

| | | | |
|---|---|---|---|
| 8,760,290 | B2 | 6/2014 | Piett et al. |
| 9,043,329 | B1 | 5/2015 | Patton et al. |
| 9,424,533 | B1 | 8/2016 | Zadeh |
| 9,544,778 | B2 | 1/2017 | Clancy, III et al. |
| 9,903,733 | B2* | 2/2018 | Bai ................ G01C 21/36 |
| 2006/0190419 | A1 | 8/2006 | Bunn et al. |
| 2006/0224797 | A1 | 10/2006 | Parish et al. |
| 2007/0005524 | A1 | 1/2007 | Iwachin |
| 2007/0222585 | A1 | 9/2007 | Sabol et al. |
| 2011/0142207 | A1 | 6/2011 | Goldman et al. |
| 2014/0172758 | A1 | 6/2014 | Klinnert et al. |
| 2015/0172896 | A1 | 6/2015 | Van Phan et al. |
| 2015/0363694 | A1 | 12/2015 | Banerjee et al. |
| 2015/0379413 | A1 | 12/2015 | Robertson et al. |
| 2016/0036899 | A1* | 2/2016 | Moody ................ G06F 16/951 709/217 |
| 2016/0132773 | A1 | 5/2016 | Chandrasekaran et al. |
| 2016/0170997 | A1 | 6/2016 | Chandrasekaran et al. |
| 2016/0171864 | A1 | 6/2016 | Ciaramelletti et al. |
| 2016/0183310 | A1 | 6/2016 | Negahban et al. |
| 2016/0189044 | A1 | 6/2016 | Pan et al. |
| 2016/0321563 | A1 | 11/2016 | Sinha et al. |
| 2017/0011299 | A1 | 1/2017 | Ebert et al. |
| 2017/0019144 | A1 | 1/2017 | Malach |
| 2017/0161614 | A1* | 6/2017 | Mehta ................ G06N 20/00 |

FOREIGN PATENT DOCUMENTS

| | | |
|---|---|---|
| KR | 10-2016-0105151 A | 9/2016 |
| WO | WO 2016/183229 A1 | 11/2016 |

OTHER PUBLICATIONS

Zimmerman et al.; "Optimizing Atlantas 911 Systems with Data Science"; http://datasmart.ash.harvard.edu/news/article/optimizing-atlantas-911-systems-with-data-science-509; Data-Smart City Solutions; Jul. 2014; accessed Jun. 2, 2017; 5 pages.

Seeman et al.; "Legal, Policy and Ethical Issues of Using Big Data and Predictive Analytics in Next Generation (NG) 911 to Notify and Aid the Dispatch of First Responders"; Alb. L.J. Sci. & Tech.; vol. 25.3; Nov. 2015; p. 547-571.

ECaTS: Information and Insights; http://www.ecats911.com/; © 2017; accessed Jun. 2, 2017; 11 pages.

"RTI International makes new 911 software open source—Software is being launched in response to a White House Call to Action as part of the Data-Driven Justice Initiative"; https://www.rti.org/news/rti-international-makes-new-911-software-open-source; RTI International; Jun. 2016; accessed Jun. 2, 2017; 4 pages.

Glenn Bischoff; "A better way to dispatch"; http://m.urgentcomm.com/blog/better-way-dispatch; Urgent Communications; Jul. 2012; accessed Jun. 2, 2017; 4 pages.

Sean Captain; "Hitachi Says It Can Predict Crimes Before They Happen"; https://www.fastcompany.com/3051578/elasticity/hitachi-says-it-can-predict-crimes-before-they-happen; Fast Company; Sep. 2015; 8 pages.

Azeez et al.; "Hybrid Approach to Crime Prediction using Deep learning"; IEEE Int'l Conf. on Advances in Computing, Communications and Informatics; 2015; p. 1701-1710.

"Cisco Emergency Responder—Version 1.2(2)"; http://www.cisco.com/c/en/us/products/collateral/unified-communications/emergency-responder/product_data_sheet09186a008009253a.pdf; Cisco Systems; 2004; 8 pages.

Wang et al.; "Learning to Detect Patterns of Crime"; Conf. on Machine Learning and Knowledge Discovery in Databases; 2013; 16 pages.

Radinsky et al.; "Mining the Web to Predict Future Events"; Proceedings of the 6th ACM Int'l Conf. on Web Search and Data Mining; 2013; 10 pages.

Fisher, Benjamin; "Improving and Expanding Conflict Forecasting"; Pennsylvania State University; Dissertation; 2016; 111 pages.

* cited by examiner

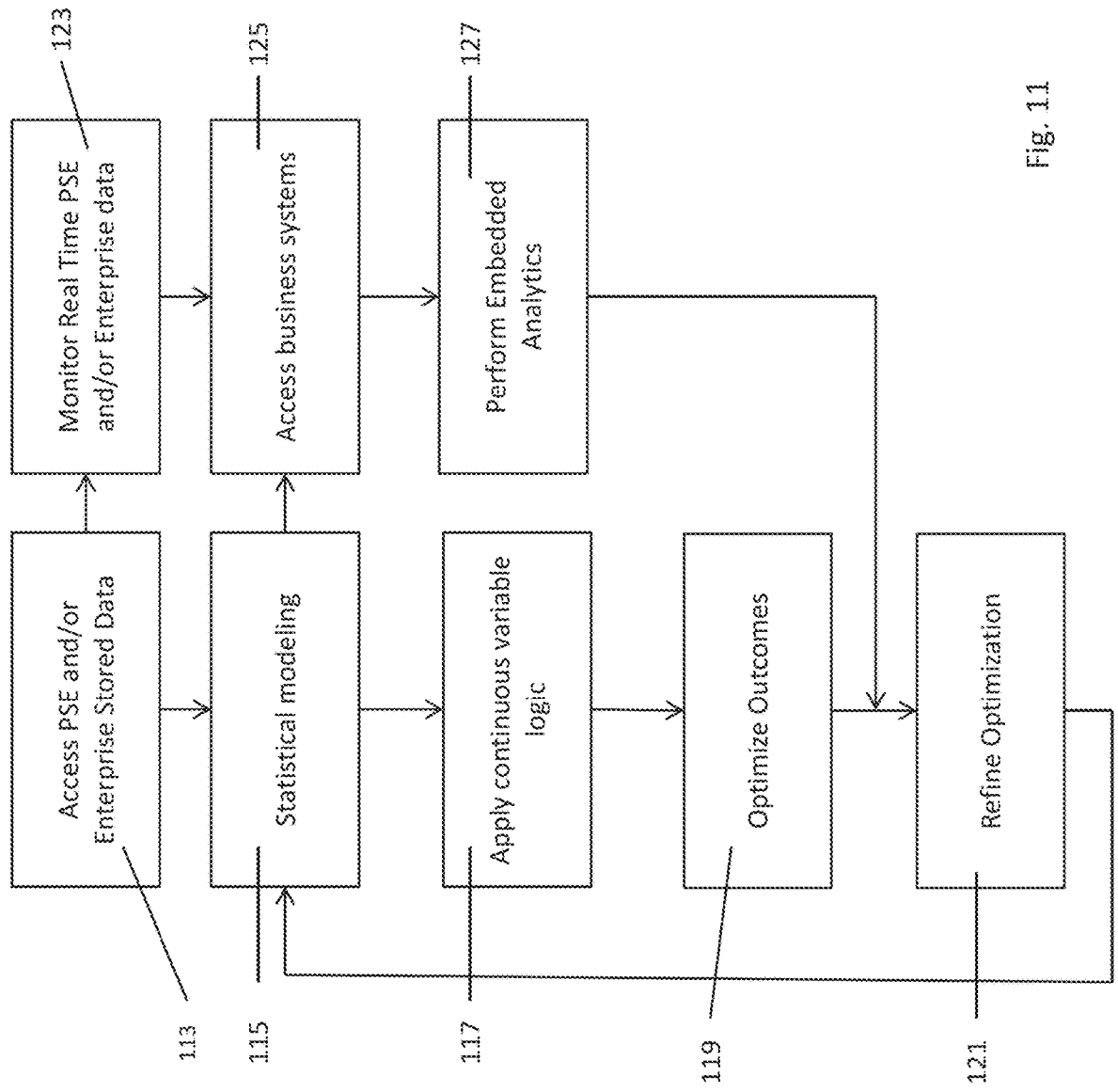
Fig. 1.1

US 10,660,157 B2

PUBLIC SAFETY ANALYTICS GATEWAY

RELATED APPLICATIONS

This patent application is a continuation of and claims priority to U.S. patent application Ser. No. 15/600,421 filed May 19, 2017 and which is hereby incorporated by reference in its entirety.

TECHNICAL FIELD

This disclosure relates generally to mobile network architecture and management for public safety uses and, more specifically, to a system and method for providing data analytics to public safety first responders in a timely and efficient manner.

BACKGROUND

Public safety first responders rely on highly-available, low-latency-access communications and network infrastructures, reflecting the overarching public safety community's requirement to respond to the entire spectrum of routine, emergency, and disaster emergency scenarios—both natural and manmade—at a moment's notice. Rapid, real-time data collection and actionable analytics based on those data are equally central to first responder immediate and properly-directed responses.

Most disasters occur without warning, and all require a rapid and flawless response with no room for error. Even if there is a warning, for example, with an approaching hurricane, the location and severity of the hurricane is not necessarily known in advance. Timely, multi-disciplinary, coordinated responses across agency lines are mission-critical to protect the communities and citizens that public safety first responders are charged to serve. Whether the event is a fire, natural disaster, vehicular collision, act of terrorism, or apprehension of suspects, highly-available, low access-latency networks, real-time data collection, and reliable, actionable analytics provide the common denominator to successful rapid response.

However, most if not all first responders do not have access to timely, actionable data analytics, especially in disaster scenarios that rely upon highly-available mobile communications and collaboration.

There is a need to create a system, architecture and method to provide first responders timely access to mission critical analytics and the networks to support efficient low-latency, high throughput, low response time, highly available communications networks based on those analytics.

SUMMARY

The present disclosure is directed to a public safety analytics gateway (PSAG) including a front end processor configured to communicate with a network gateway and a public safety enterprise server and a data collector in communication with the front end processor, wherein the front end processor is configured to receive public safety data from the public service enterprise server and forward the public safety data to both the network gateway and the data collector. The public safety analytics gateway may further include a recommendation engine in communication with the front end processor, the recommendation engine configured to capture mobile search data associated with a first responder user device, store the mobile search data, and generate metadata associated with the mobile search data.

The public safety analytics gateway may further include a data analytics engine in communication with the data collector and wherein the data analytics engine is configured to analyze public safety data wherein the data analytics comprises one of descriptive analytics, diagnostic analytics, predictive analytics, and prescriptive analytics.

In an aspect, the data analytics is used to monitor mobile application at least one of access latency, throughput, response time, and availability wherein mobile access applications comprise one of voice, data, video, graphics, and text applications for first responders. The recommendation engine may be in communication with the front end processor wherein the recommendation engine configured to capture mobile search data associated with a first responder user device, store the mobile search data, and generate metadata associated with the mobile search data.

In an aspect, the public safety analytics gateway may include an artificial intelligence engine in communication with the recommendation engine and the data analytics engine wherein the artificial intelligence engine is configured to store a plurality of records and generate outcomes from interaction with field-based sensors thereby facilitating predictive alert conditions and response scenarios.

The public safety analytics gateway may be in communication with external servers and/or with a second public safety analytics gateway apparatus in a network. The public safety analytics gateway may provide a central point of integration of public safety embedded control data on behalf of a plurality of distributed Radio Access Network (RAN) elements.

The disclosure is also directed to an apparatus including an input-output interface, a processor coupled to the input-output interface and wherein the processor is coupled to a memory, the memory having stored thereon executable instructions that when executed by the processor cause the processor to effectuate operations including receiving data associated with public safety and data not associated with public safety, discerning the data associated with public safety from the data not associated with public safety, capturing the data associated with public safety and transmitting the data associated with public safety and the data not associated with public safety to a gateway. The operations may further include identifying search patterns from a first responder user device, applying metadata to the search patterns, refining the search patterns based on the identifying step, and generating search recommendations as a function of the metadata and an identification of the first responder user device.

In an aspect, the operations may further include causing the data associated with public safety to be stored. The operations may further include analyzing the data associated with public safety in real time and adjusting a data collection process based on whether there is an emergency event. The operations may further include tracking a location of emergency vehicles or a location of first responders. The operations may further include receiving data from one of a plurality of servers and the server may be configured to aggregate data associated with public safety from a plurality of similarly configured apparatuses. The operations may further include integrating data from a plurality of public safety mobile applications and a plurality of first responder user devices.

The disclosure is also directed to a wireless network including a network gateway in communication with a plurality of application servers, a public safety analytics gateway in communication with the plurality of gateways, the public safety analytics gateway comprising a front end processor configured to communicate with the network gateway and a public safety enterprise server and a data collector in communication with the front end processor wherein the front end processor is configured to receive public safety data from the public service enterprise server and forward the public safety data to both the network gateway and the data collector. The wireless network may further include a plurality of network gateways and a plurality of public safety analytics gateways wherein each public safety analytics gateway of the plurality of public safety analytics gateways is in communication with one or more network gateways of the plurality of network gateways, and a master public safety analytics gateway in communication with each of the plurality of public safety analytics gateways, wherein the master public safety analytics gateway collects public safety data from the plurality of public safety analytics gateways.

BRIEF DESCRIPTION OF THE DRAWINGS

In the following description, for purposes of explanation, numerous specific details are set forth in order to provide an understanding of the variations in implementing the disclosed technology. However, the instant disclosure may take many different forms and should not be construed as limited to the examples set forth herein. Where practical, like numbers refer to like elements throughout.

FIG. 10b is a continuation of the exemplary flow diagram illustrating a method of analyzing emergency data from FIG. 10a.

FIG. 11 is an exemplary flow diagram continuing the illustration of a method of analyzing emergency data from FIGS. 10a and 10b.

DETAILED DESCRIPTION

Overview. As detailed herein, the present disclosure is directed to a system and method for providing data analytics to public safety professionals, including first responders. A new network element is disclosed comprising a Public Service Analytics Gateway (PSAG). In an aspect, the PSAG will reside in a core mobile telecommunications network and may, for example, provide front-end processing for Long Term Evolution (LTE) and third generation (3G) General Packet Radio Service Support Node (GGSN) carrier core network gateways.

In an aspect, the PSAG may include an Artificial Intelligence (AI) element incorporating deep learning components, thereby enabling the AI engine to store a plurality of records and "learn" from interaction with field-based sensors. The PSAG AI engine may, for example, be both predictive and prescriptive in its analytics, thereby facilitating timely forward-predictive alert conditions and response scenarios.

In an aspect, the PSAG AI-based predictive and prescriptive analytics elements may proactively and dynamically respond to mobile network access latency and throughput degradation, which if unattended, also adversely impact response time and network availability. In this manner, the PSAG may dynamically interface with network operations and Operations Support Systems (OSS) systems in near-real time to proactively modify logical topologies and network resource allocations in order to continually assure low access latency, high throughput, and sufficient Quality of Service (QoS)/Priority Preemption (QPP) to public safety agencies and the first responders.

Furthermore, mobility network access latency and throughput degradation issues would most likely compound during metropolitan, regional, state, or national emergency events, based on extraordinary volumes of massively parallel emergency service data, voice, and video traffic access requests sufficient to compromise traffic shaping and policy-based network infrastructures at the worst possible junctures. The present disclosure in which PSAG-resident predictive and prescriptive analytics is further described may avert on a near-real time basis such latency and throughput degradation, and attendant response time and network availability degradation.

Figure 1:
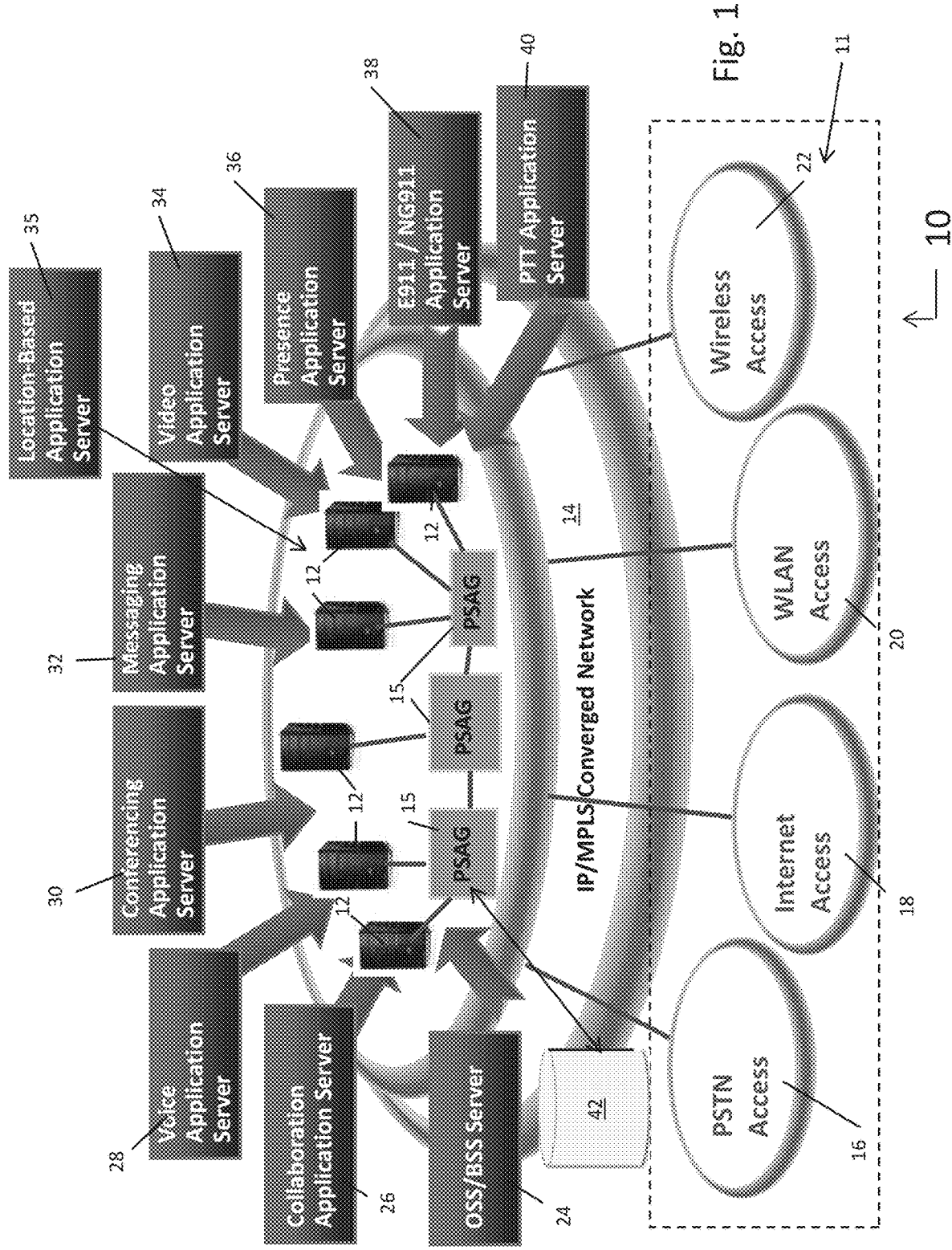
FIG. 1 is a representation of an exemplary network configuration showing Public Safety Analytics Gateway elements in accordance with the present disclosure.

System Architecture. In an aspect, PSAG 15 is envisioned to reside in a core telecommunications network. With reference to FIG. 1, there is shown an exemplary system 10 comprising external access points 11 and an Internet Protocol/Multiprotocol Label Switching (IP/MPLS) converged network, which will be referred to herein as network 14. Examples of the external access points shown include a public switched telephone network (PSTN) access point 16, an internet access point 18, a wide-area local area network (WLAN) access point 20 and a wireless access point 22. Such external access points 11 are exemplary only and may include other access points including virtual private network (VPN) access points, Wi-Fi access points, and any other access points capable of interfacing with the IP/MPLS converged network 14. While an IP/MPLS converged network 14 is shown as an example, the disclosure is applicable to any type of wireless communication network, including 3G, fourth generation (4G)/LTE, fifth generation (5G), and any other wireless communication network.

Figure 5:
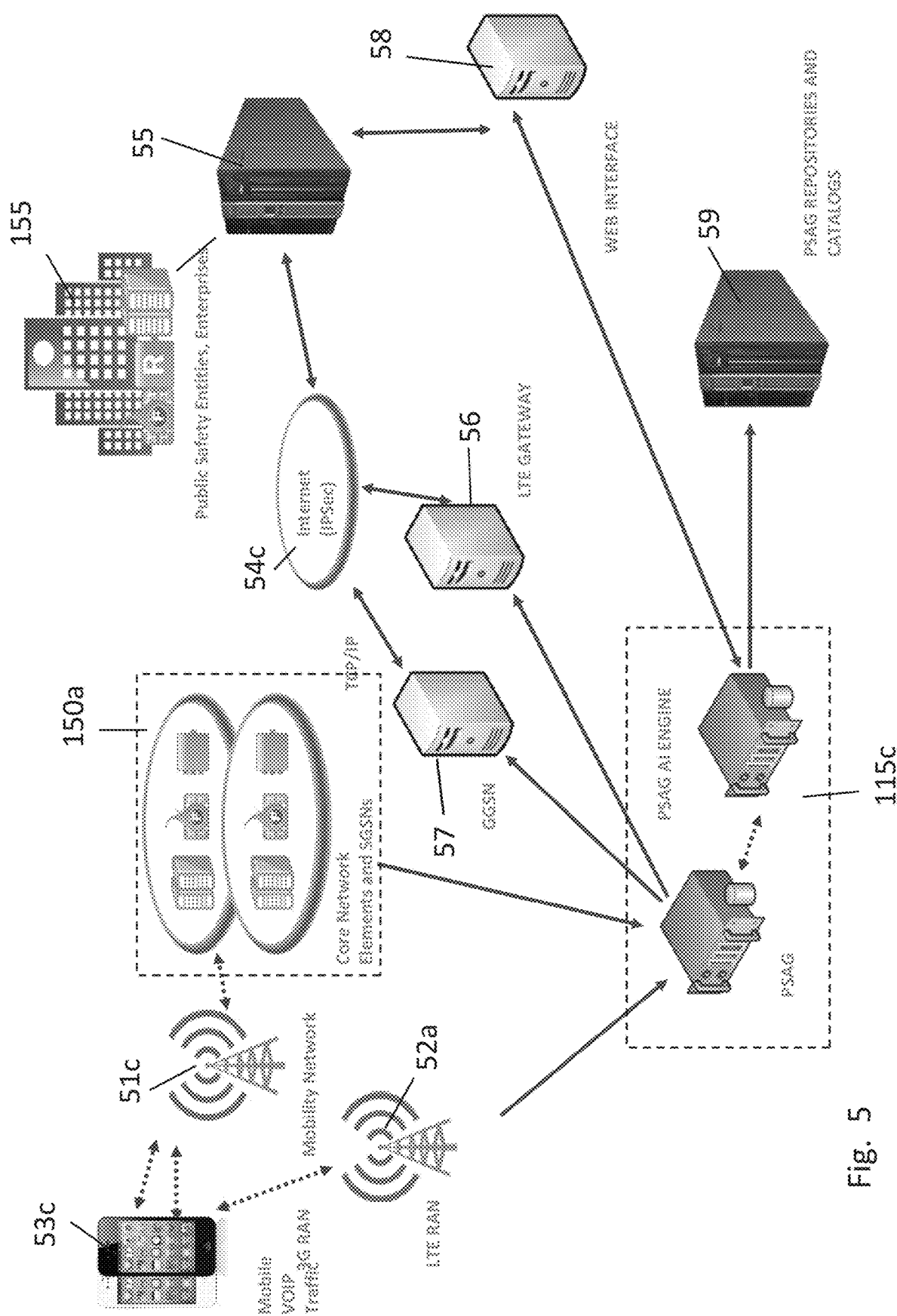
FIG. 5 is a representation of another exemplary network configuration showing Public Safety Analytics Gateway elements in accordance with the present disclosure.

Within the network 14, there is shown a series of gateways 12 which may, for example, be Long Term Evolution (LTE) gateways and/or third generation (3G) Gateway General Packet Radio Service Support Node (GGSN) carrier core network gateways shown in more detail in FIG. 5. These gateways 12 may provide network 14 access to a series of servers as set forth below.

A series of servers forms part of the system 10 and may be accessed through gateways 1. These servers, for example, include but are not limited to an Operations Support System/Business Support System (OSS/BSS) server 24, a collaboration application server 26, voice application server 28, conferencing application server 30, messaging application server 32, video application server 34, location-based application server 35, presence application server 36, Emergency 911/Next Generation 911 (E911/NG911) application server 38 and push-to-talk application server 40. It will be understood that these exemplary servers are referred to generically by function and may include two or more of these exemplary servers may reside on one or multiple hardware components. It is also understood that one or more of these exemplary servers may be comprised of proprietary special-purpose hardware or be implemented using virtual machines in a software defined network.

Also shown in FIG. 1 is a series of Public Safety Analytics Gateways (PSAGs) 15. In an aspect, PSAG 15 may reside in the core network 14, and may front-end gateways 12, including LTE gateways and GGSN core network gateways. In addition, PSAG 15 may be implemented as a front-end processor (FEP), or as a software-defined network (SDN) element in a homogenous software defined network or a hybrid SDN network. PSAG 15 may also be implemented as a cloud network component and may reside within a cloud computing environment. The PSAG 15 may access public safety mobile applications through a plurality of internal and external interfaces. Such mobile applications may, for example, include computer-aided dispatch, E911, incident command and control, first responder data, body camera data, and the like.

PSAG 15 may provide a data analytics application programming interface (API)-based structured programming interface on behalf of public safety agencies and other enterprises that provide support and service to such agencies. PSAG 15 may collect data from one or more multiple public safety entities and from one or more mobile applications accessible and used by such entities and/or first responders. Data collected may, for example, be stored and accessible in a data lakes repository 42. In an aspect, these data in data repositories 42 may reside in a cloud storage environment.

Among the functions of the PSAG 15 is the generation of a highly-available public safety data analytics. The PSAG 15 may facilitate having a single data analytics image across a plurality of public safety-centric, mobile computing-based, heterogeneous processing platforms and runtime environments on behalf of first responders. Such an image may, for example, be from a user's perspective in an operational environment at a public safety enterprise (PSE) which may render various user interfaces and operating systems transparent to the PSE even across heterogeneous platforms.

In an aspect, PSAG 15 may include an Artificial Intelligence (AI) element incorporating deep learning components, enabling the AI engine to store or access a plurality of records and "learn" from interaction of field-based sensors which may, for example, communicate with PSAG 15 or other network elements or external elements through an internet of things (IoT) protocol. The PSAG 15 AI engine, described in more detail below, would be both predictive and prescriptive, thereby facilitating timely forward-predictive alert conditions and response scenarios.

With PSAG 15 placed within the network 14, PSAG 15 may act as a central point of integration within and among a set of public safety applications and implementations. For example, in an aspect, PSAG 15 may provide a central point of integration within and among a plurality of public safety-centric mobile applications through a single carrier core network LTE gateway, or through a plurality of carrier core networks LTE gateways. In another aspect, PSAG 15 may provide a central point of integration within and among a plurality of public safety mobile applications through a software-defined element as a functional superset of a carrier core network Commercial Connectivity Service (CCS) LTE gateway, or through a plurality of carrier core network CCS LTE gateways. In another aspect, PSAG 15 may provide a central point of integration within and among a plurality of public safety mobile applications through a carrier core network GGSN gateway, or through a plurality of carrier core network GGSN gateways.

In another aspect, PSAG 15 may provide a central point of integration within and among a plurality of public safety mobile applications and mobile devices, or within and among a plurality of public safety mobile applications for Internet Protocol (IP) data originating from Signaling System 7 (SS7) packet(s). In an aspect, PSAG 15 may provide a central point of integration within and among a plurality of public safety mobile applications and public safety mobile devices for short message service (SMS) data and or multimedia messaging service (MMS) data.

In another aspect, PSAG 15 may provide a central point of integration for public safety location-based services and Global Positioning System (GPS) coordinate-based data. In another aspect, PSAG 15 may provide a central point of integration within and among a plurality of public safety mobile applications and public safety mobile devices to optimize dynamic Quality of Service (QoS), Priority and Preemption (QPP). In yet another aspect, PSAG 15 may provide a central point of dynamic, software-defined management, control and provisioning function within and among a plurality of carrier-based core networks, similar to or complementary with network 14.

Figure 2:
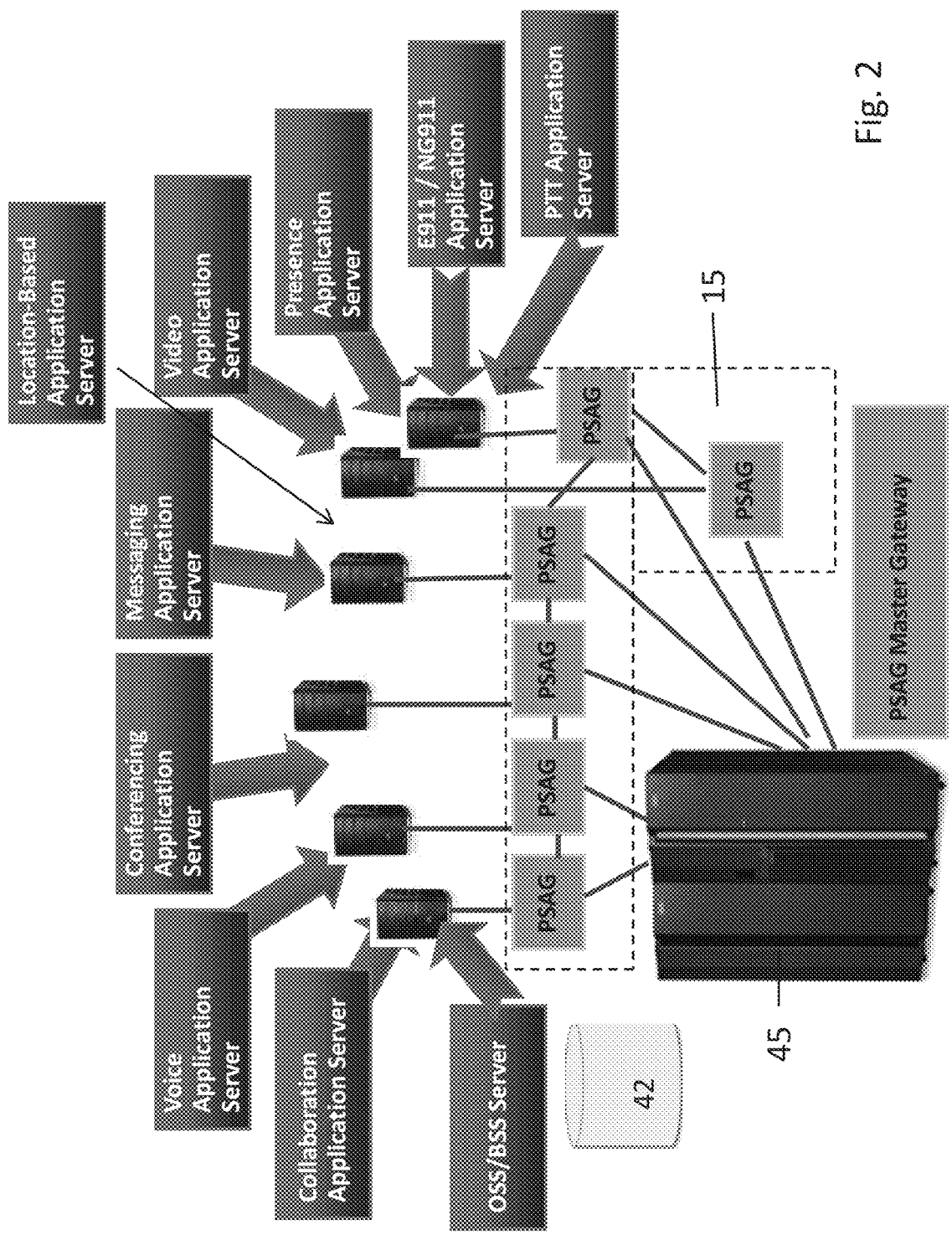
FIG. 2 is a representation of an exemplary network configuration showing Public Safety Analytics Gateway elements connected to a PSAG Master Gateway in accordance with the present disclosure.

While FIG. 1 illustrates the PSAG 15 within network 14, in another embodiment, there may be a PSAG mediator 45 shown in FIG. 2 that resides outside of network 14. PSAG mediator 45 residing outside of a carrier network may function in a domain placed between the carrier PSAG 15 and one or more public safety entity (PSE) enterprise mobile applications. PSAGs 15 resident in the carrier core network 14 may communicate with PSE mobile applications using one or more application programming interfaces (APIs). The PSAG mediator 145 may then translate communication requests between the mobile application and the PSAG 15 requests into subsequent requests to individual carrier PSAG APIs. This embodiment would enable PSEs to interface with a single global PSAG mediator 145 rather than to a variety of carrier-specific PSAGs such as PSAG 15. This embodiment may facilitate more efficient communications between and interoperability among multiple carriers and one or more PSEs.

Figure 3:
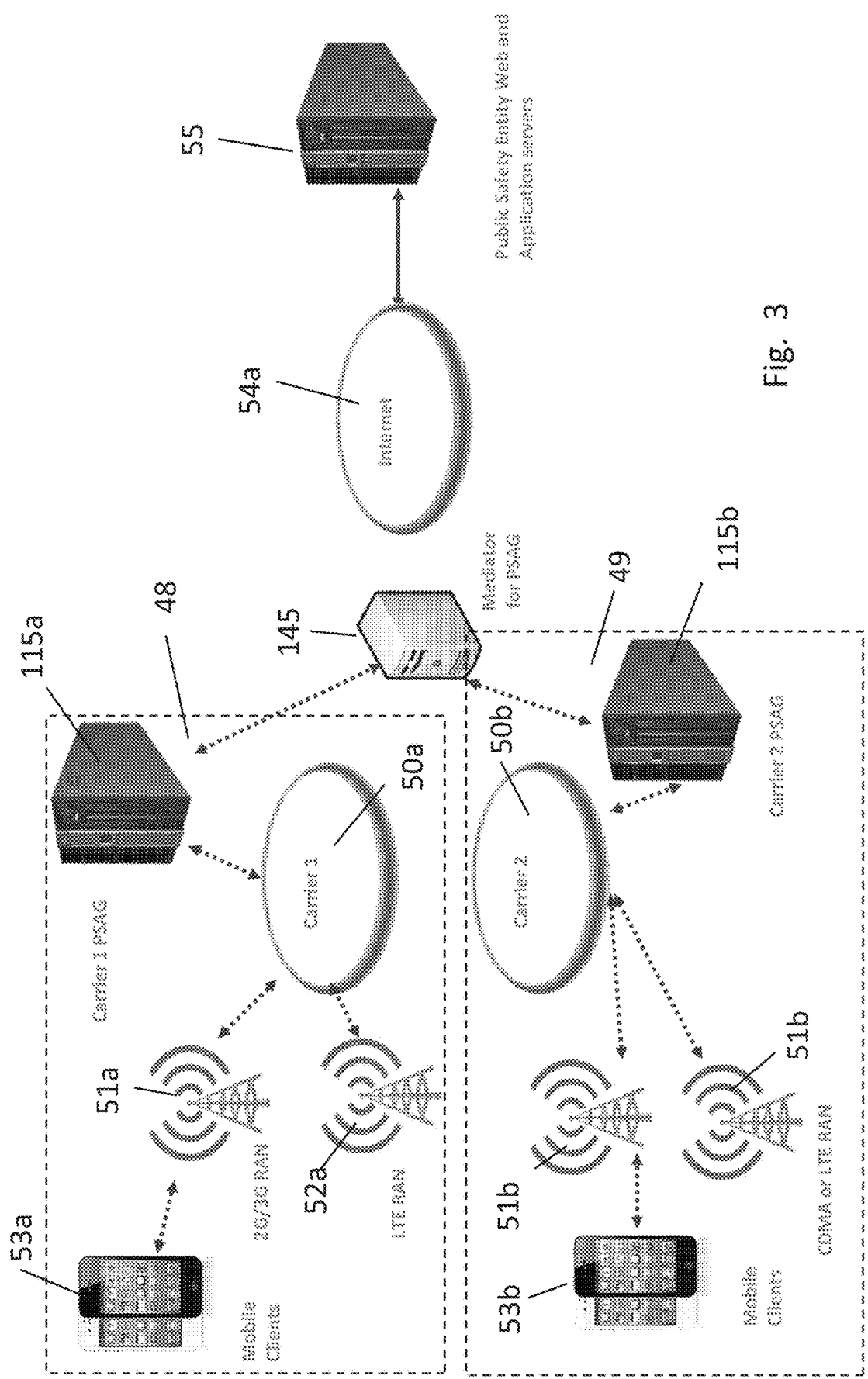
FIG. 3 is an alternative embodiment of the network in FIG. 1 further including a Public Safety Analytics Gateway mediator element within a multi-carrier network environment.

FIG. 3 is an exemplary embodiment in which the PSAG mediator 145 is shown as the mediator between two carrier networks, carrier 1 network 48 and carrier 2 network 49. Within carrier 1 network 48, there is shown PSAG 115a in communication with PSAG gateway 145 and carrier 1 network 50a. Part of carrier 1 network 50a shown includes legacy 2G/3G RAN network components 51a which interface with mobile clients 53a and LTE RAN network components 42a. Within carrier 2 network 49, there is shown PSAG 115b in communication with PSAG gateway 145 and carrier 2 network 50b. Part of carrier 2 network 50b shown includes legacy 2G/3G RAN network components 51b which interface with mobile clients 53b and LTE RAN network components 51b As shown in FIG. 3, each of the carrier 1 networks 48 and the carrier 2 networks 49 may be in communication with one or more PSE web and applications servers 55 through the PSAG mediator 145 connected to the internet 54a. In an alternative embodiment shown in FIG. 4, PSAG mediator 145 is not included and each of the carrier 1 networks 148 and the carrier 2 networks 149 is shown in direct communication with one or more PSE web and applications servers 55 through the internet 54b.

In an aspect, a PSAG appliance (not shown) may reside in a PSE network and would interface closely with a carrier network-resident PSAG 115a. The PSAG appliance may receive integrated and correlated records, and communicate with PSAG 115a in a secure manner in order to request further information or to receive data analytics.

Figure 4:
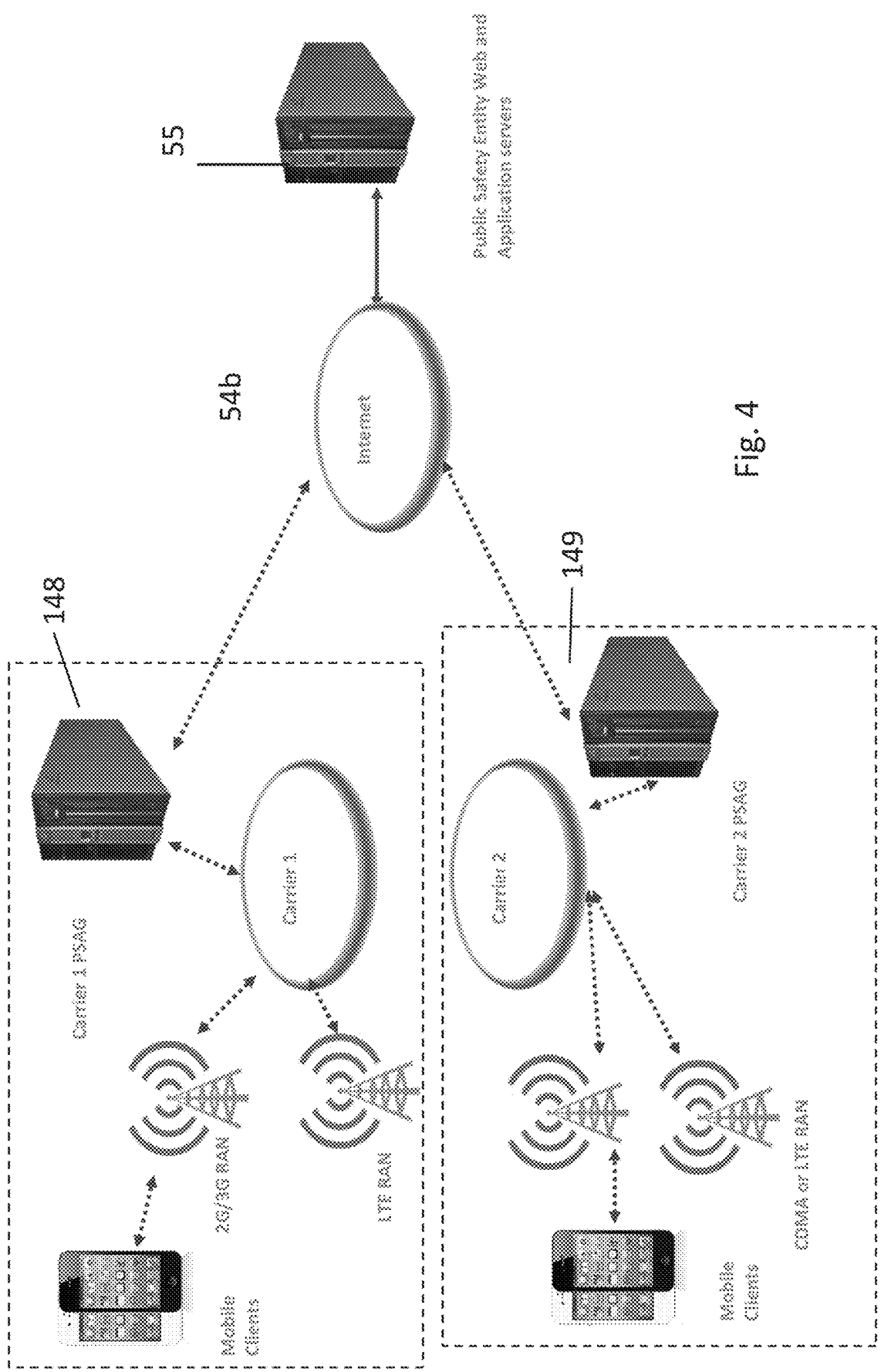
FIG. 4 is a representation of an exemplary network configuration showing Public Safety Analytics Gateway elements within a multi-carrier network connected to a plurality of Public Safety Entity (PSE) web and application servers following direct connection via the FIG. 3 PSAG mediator element.

FIG. 5 illustrates a more detailed view of an exemplary architecture of FIGS. 3 and 4 showing a mobile network single carrier system and the various interconnections between PSAG 115c and mobile applications resident on user mobile device clients 53c. The PSAG 115c is shown as having an interface to the core network elements and Serving GPRS Support Nodes (SGSNs) 150a and the LTE Radio Access Network (RAN) 52a. The PSAG 115c is also shown as a front end processor to the GGSN 57 and LTE Gateway 56, which in turn interface with the Internet 54c to communicate with the PSE web and applications servers 55 which may, for example be housed within public safety entities (PSEs) or other enterprises or government offices 155. The PSAG 115c may also have a web interface 58 to the PSE web and applications servers 55.

Figure 6:
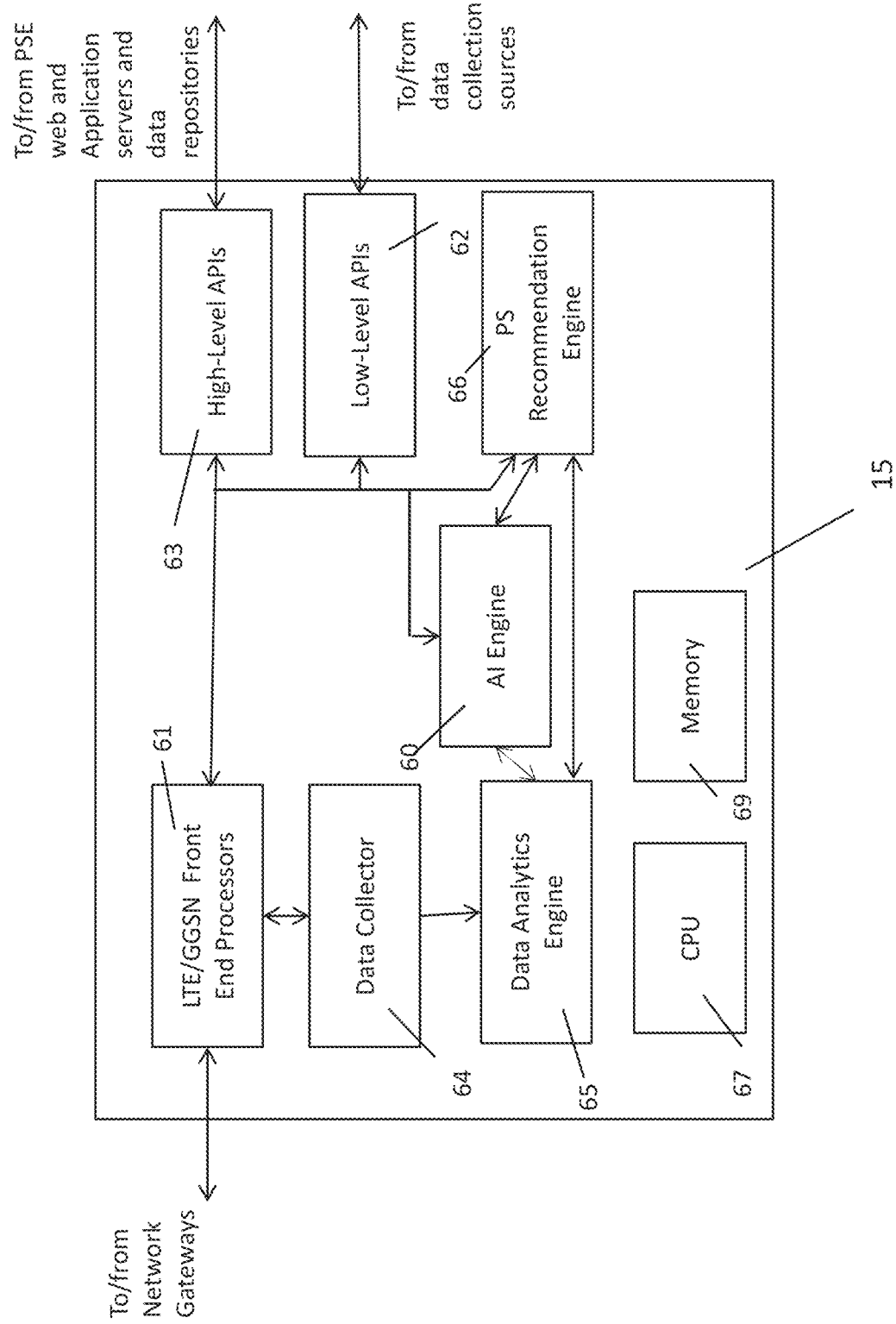
FIG. 6 is an exemplary functional diagram of a Public Safety Analytics Gateway.

FIG. 6 illustrates a functional diagram of an exemplary PSAG 15. There is shown an artificial intelligence (AI) engine 60 incorporating deep learning logic, the LTE and GGSN interfaces 61, low-level application programing interfaces (APIs) 62 for data collection, storage and processing and external high-level APIs 63 for connectivity to PSE web and application servers 55 and the other exemplary servers and Data Lakes 42 shown in FIG. 1. There is also a data collector 64 which may, for example, be used for capturing relevant data traffic between first responders using mobile applications and PSEs. As such, the data collector 64 may provide a central point of continuous, event-driven and/or query-driven data acquisition and delivery models on behalf of and among a plurality of mobile applications and public safety mobile devices.

PSAG 15 also incorporates a Data Analytics Engine 65 that generates actionable descriptive analytics 75, diagnostic analytics 76, predictive analytics 77, and prescriptive analytics 78, directed to minimizing mobile network and mobile application access latency and response time, maximizing mobile network and mobile application throughput and network availability, and optimizing mobile network and mobile application end-to-end connectivity for a plurality of voice, data, video, graphics, and text applications directed to Public Safety First Responders.

PSAG 15 would also incorporate a PS Recommendation Engine (PSRE) 66 that would capture Public Safety First Responder mobile search requests, identify search patterns by individual users and user groups, store mobile search data, generate mobile search metadata, and perform analytics on the data by interface to the Data Analytics Engine 65 and AI Engine 60. PSRE 66 would provide recommendations in response to Public Safety mobile search requests, refine recommendations as a function of iterative mobile search request patterns, and proactively generate recommendations as a function of mobile user and group search history coupled with present in-field circumstances.

In an aspect, PSAG 15 may provide a central point of integration of public safety embedded control data on behalf of a plurality of Evolved Packet Core (EPC) network elements including for example, Packet Gateway (PGW), Home Subscriber Server (HSS), Mobility Management Entity (MME), Diameter Routing Agent (DRA), Domain Name Server (DNS), Virtual Private Network (VPN) router, Subscriber Profile and Policy Repository (SPR), Policy and Charging Rules Function (PCRF), Policy and Charging Enforcement Function (PCEF), Security Gateway (SeGW), System Architecture Evolution-Gateway (SAE-GW).

In an aspect, PSAG 15 may provide a central point of integration of public safety embedded control data on behalf of a plurality of Universal Signaling Platform (USP) network elements including for example, HSS, DRA, DNS, Electronic Numbering (ENUM), Session Border Controller (SBC), Lawful Intercept Gateway (LIG), Border Gateway Control Function (BGCF) and Internet Protocol Multimedia System (IM).

In an aspect, PSAG 15 may provide a central point of integration of public safety embedded control data on behalf of a plurality of distributed Radio Access Network (RAN) elements including for example, Baseband Unit (BBU), Remote Radio Unit (RRU), evolved Node B (eNodeB, eNB), and Multi-Operator Core Network (MOCN).

In an aspect, PSAG 15 may provide a central point of integration of embedded control data on behalf of a plurality of public safety application servers.

PSAG 15 may be implemented as a general purpose computer programmed to provide the functions set forth above, and as such, may have a CPU function 67 and a memory 69 for storing executable instructions thereon.

Figure 7:
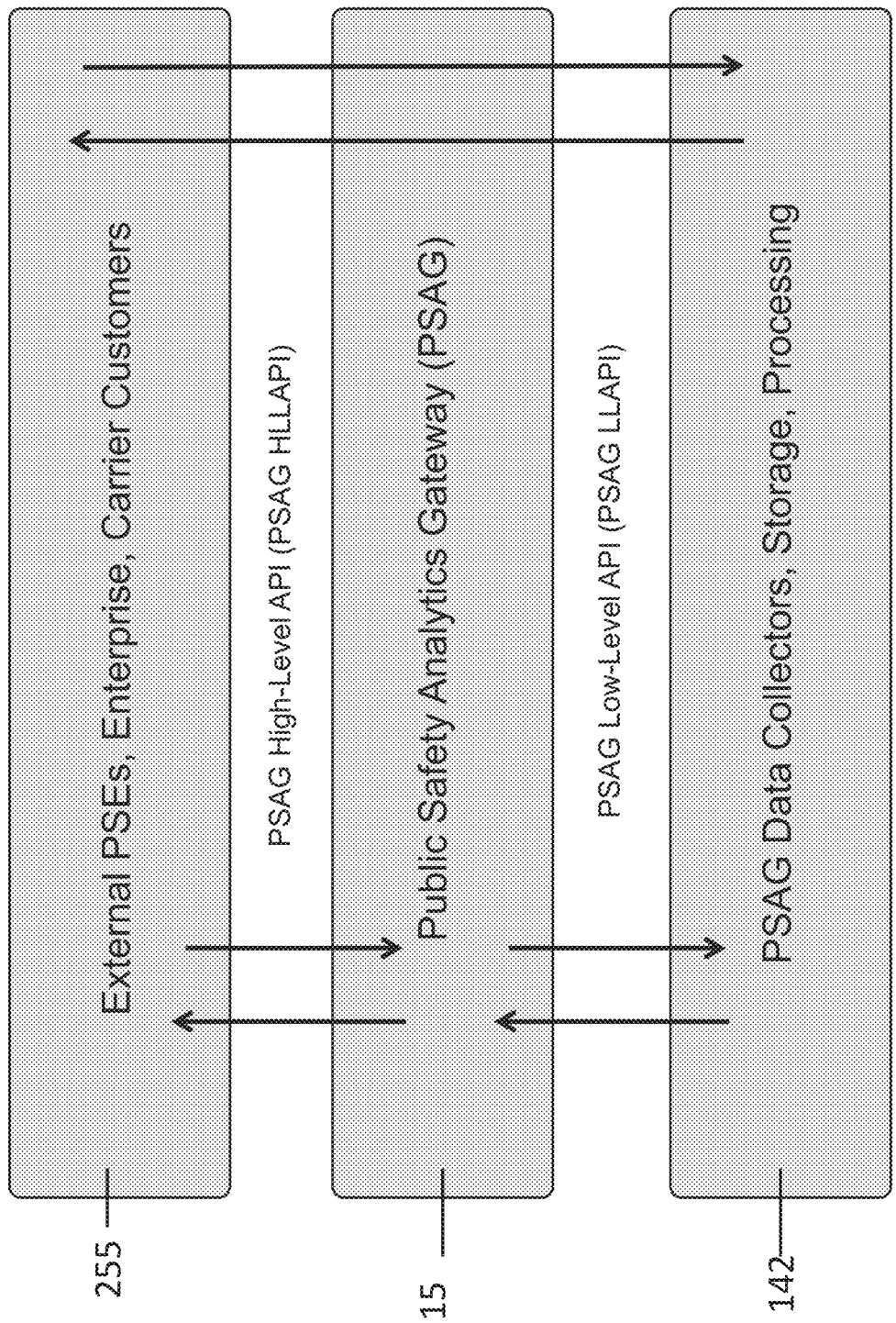
FIG. 7 is an exemplary functional diagram of a Public Safety Analytics Gateway showing exemplary application programming interfaces.

FIG. 7 shows an exemplary functional description of the high-level APIs and the low level APIs associated with PSAG 15. The high-level APIs may, for example, interface with external PSEs, Enterprise customers and carrier customers APIs which may, for example, interface with PSAG data collectors, storage and processing functions 142 either internal to the PSAG 15 or external to PSAG 15. With these various high level and low-level APIs and with its position in the carrier network 14 and access to various application servers, PSAG 15 may provide a central point of dynamic, software-based, optimized data-centric, hierarchical, and location-based routing and switching functions within and among a plurality of public safety mobile applications and public safety mobile devices and to external, non-PSAG software-defined components.

Software Defined Network Implementation. In an aspect, the PSAG functionality may be implemented through software defined network (SDN) functioning as a virtual network function (VNF) operating on a virtual machine (VM). In an aspect, a software image having executable programming code embedded therein may be loaded onto a hardware platform having memory, a central processing unit (CPU) that may be configured as a virtual CPU, a network interface, and other resources. A hardware platform may serve as a host to one or VMs configured to perform the PSAG functionality.

In an SDN implementation, the data repository 42 may be cloud-based such that storage may be dynamically allocated based on traffic, processing requirements or other criteria. In a cloud based data repository 42, PSEs and other entities may be granted access to the data repository 42 for analysis or any other purpose. Additionally, cloud-based data repositories 42 may facilitate the interaction among and between multiple carriers, thereby increasing both the quantity and quality of the data and subsequently permit the emergency responses to be more timely and efficient.

The PSAG functionality may be deployed in geographically diverse regions to minimize latency and other network delays. An SDN configuration may facilitate such deployments. There may also be different applications targeted for various instances of the VM. For example, there may be local PSAG instantiations in an SDN implementation that only collect and manage data from local events like traffic accidents and 911 ambulance calls and then feed that data into the data repository 42. There may be other instantiations of a PSAG that are targeted for natural disasters such as floods, tornadoes, hurricanes or earthquakes, as well as a plurality of manmade disaster scenarios. This may allow the virtual resources to be used for other functionality when such natural disasters or manmade disaster events are not occurring, thereby allowing the network to operate more efficiently.

In an SDN implementation, a VNF may be directed to a PSAG mediator and one or more VNFs may be directed to the PSAG itself. As such, the PSAG mediator may operate on the same hardware platform as a PSAG or on a different platform apart from the one or more PSAGs.

Data Collection and Storage. In an aspect, as a front end processor for either an LTE gateway or a GGSN, one or more PSAGs 15 may continually be monitoring, analyzing and storing emergency communications data. Referring back to FIG. 6, the front end processor (FEP) 61 function within PSAG 15 may provide a simple pass-through to the LTE gateway or GGSN for data that is not associated with emergency data traffic. With respect to emergency data traffic, the front end processor may also provide that emergency data traffic to the data collector 64 while at the same time passing through that emergency data traffic to its intended destination in the network 14. The discernment between emergency data traffic and non-emergency data traffic may be based on metadata, tags, origination or destination identification of the data, header information, or any other identification method. For example, all data originating from or directed to a PSE may be routed to the data collector 64. Likewise, all data originating from or directed mobile applications on user devices of first responders may be routed to the data collector 64. Sensor data, including data from sensors that monitor emergency supplies and status, for example, and data from sensors that monitor the locations, amounts and temperatures of blood reserves to be used in an emergency situation may also be routed to the data collector 64 though the internet access 18 to the network 14 using IoT functionality.

The PSAG 15 may also request and/or continually or periodically automatically receive data to be stored and aggregated with the emergency data traffic from applications servers within the network 14 such as those described with respect to FIG. 1. For example, it is envisioned that PSAG 15 may be in constant communication and receiving data from the E911/NG911 application server 38 and the location-based application server 35 to track the location of emergency vehicles and the user devices of first responders.

Additionally, PSAG 15 may also request and/or continually or periodically receive data from external servers that may provide additional relevant data. For example, PSAG 15 may request or receive data from an external weather server, for example, a weather server hosted by the National Weather Service to track the path of hurricanes, tornadoes and other severe weather. PSAG 15 may also, for example, collect data from one or more external servers associated with commercial travel schedules for public transportation, for example, airlines, trains and bus routes and schedules. Other external server data may include, but is not limited to, data associated with public and private events, including events such as Presidential inaugurations, the World Cup soccer tournament, or the Super Bowl that may impact emergency situations in terms of first responder readiness. Other data may include traffic data and construction delays during certain hours that may impact first responder travel time to an incident.

The AI engine 60 may also adjust the type, amount and time period for data collection and may do so, for example, based on whether there is an emergency situation and if so, the status of that emergency situation. The AI engine 60 may use, for example, streaming analytics to adjust the data collection process in real time or near-real time based on the data being processed.

It will be understood that the data collection function may be performed locally for a particular geographic area or nationally or a combination thereof. Data may be collected within a single PSAG 15 or across all PSAGs 15 in a network 14. Data collection may be coordinated across multiple networks using PSAG mediator 145. It will also be understood that the above data collector 64 functionality is exemplary only and can be expanded or restricted in the type, quantity and time periods that emergency traffic data are collected.

It will also be understood that the data collected may be stored at least temporarily locally with in the PSAG 15 or stored in data repository/Data Lakes 42. The data repository/Data Lakes 42 may be located within network 14 or in the cloud such that multiple parties, service providers and applications may have access to the emergency traffic data.

Regardless of where the data repository is located, it may be accessed by one or more network access points 11 described in FIG. 1, which may for example, include PSTN access 16, Internet access 18, WLAN access 20, wireless access 22, a Wireless Fidelity (WiFi) access point (not shown) or any other access point to the network or to the storage cloud.

Figure 8:
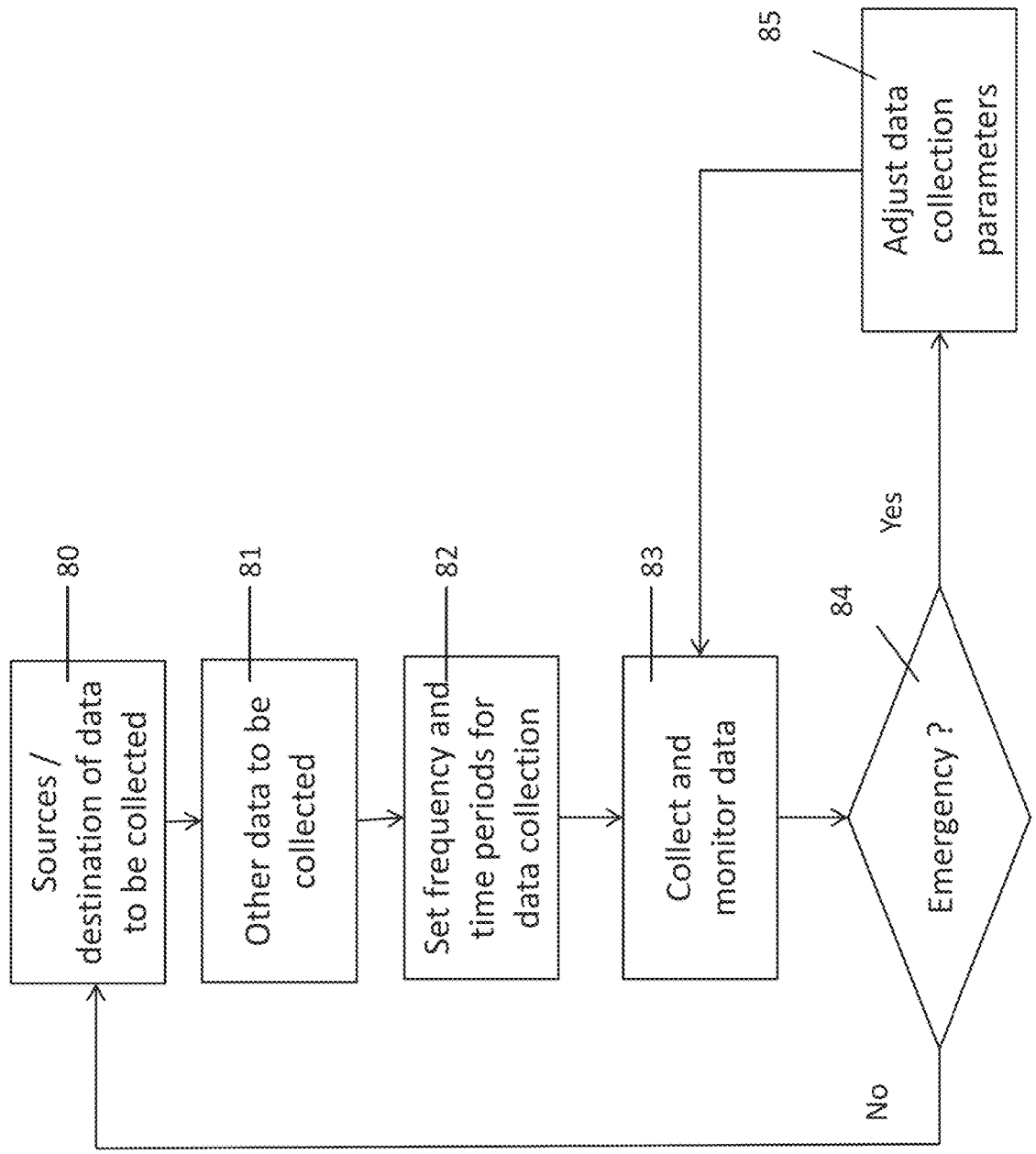
FIG. 8 is an exemplary flow diagram illustrating a method for collection of emergency data.

With reference to FIG. 8, there is shown an exemplary process for collection of data in accordance with the present disclosure. At 80, the sources and destination of data to be collected is identified as described above. At 81, any other data to be collected, including data from sensors, network and external servers, is identified. At 82, the frequency and time period for such data collection is set. For example, the frequency and time period for communications to/from first responders and PSEs may be continuous, while the frequency of queries to a weather server may be periodically every hour during a 24 hour cycle. At 83, the data are collected and monitored by the PSAG 15, including an analysis of the data by AI engine 60. At 84, if an emergency situation, either nationally, regionally or locally is detected, then the data collection parameters may be adjusted at 85 and the data collection and monitoring is continued at 83. If at 84 there is no emergency situation or if the emergency situation has been resolved, the process repeats at 80 and the data to be collected are reset and monitored as shown.

Figure 14:
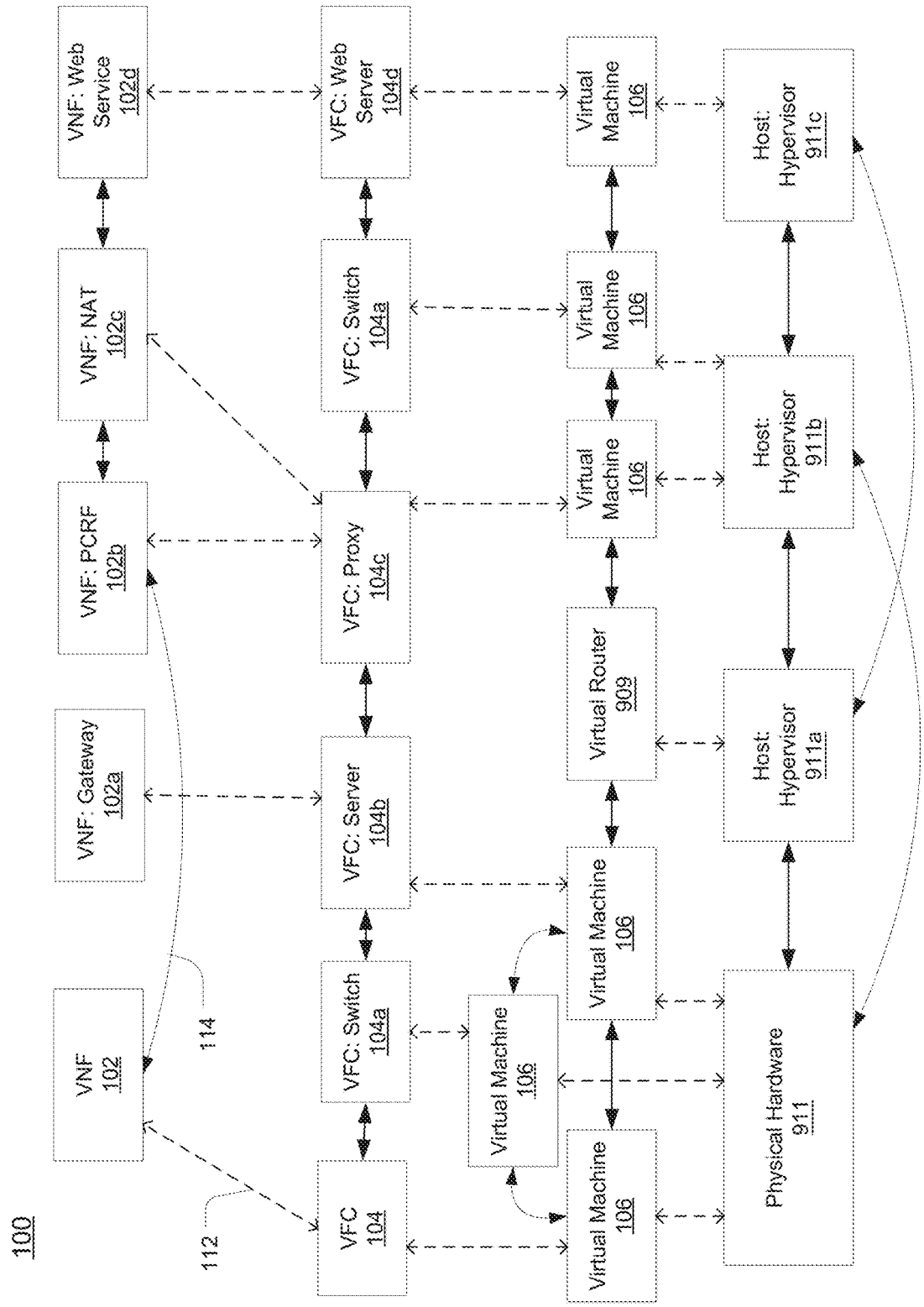
FIG. 14 is a representation of an exemplary software defined network.

Software Defined Network Detailed Description. FIG. 14 is a representation of an exemplary network 100. Network 100 may comprise a Software Defined Network (SDN)— that is, network 100 may include one or more virtualized functions implemented on general purpose hardware, such as in lieu of having dedicated hardware for every network function. That is, general purpose hardware of network 100 may be configured to run virtual network elements to support communication services, such as mobility services, including consumer services and enterprise services. These services may be provided or measured in sessions Virtual network functions (VNFs) 102 may be able to support a limited number of sessions. Each VNF 102 may have a VNF type that indicates its functionality or role. For example, FIG. 14 illustrates a gateway VNF 102a and a policy and charging rules function (PCRF) VNF 102b. Additionally or alternatively, VNFs 102 may include other types of VNFs. Each VNF 102 may use one or more virtual machines (VMs) 106 to operate. Each VM 106 may have a VM type that indicates its functionality or role. For example, FIG. 14 illustrates multiple VMs 106 that may include MCM VM, an ASM VM, and a DEP VM. Additionally or alternatively, VMs 106 may include other types of VMs. Each VM 106 may consume various network resources from a server 112, such as a resource 108, a virtual central processing unit (vCPU) 108a, memory 108b, or a network interface card (NIC) 108c in FIG. 15. Additionally or alternatively, server 112 may include other types of resources 108.

Figure 15:
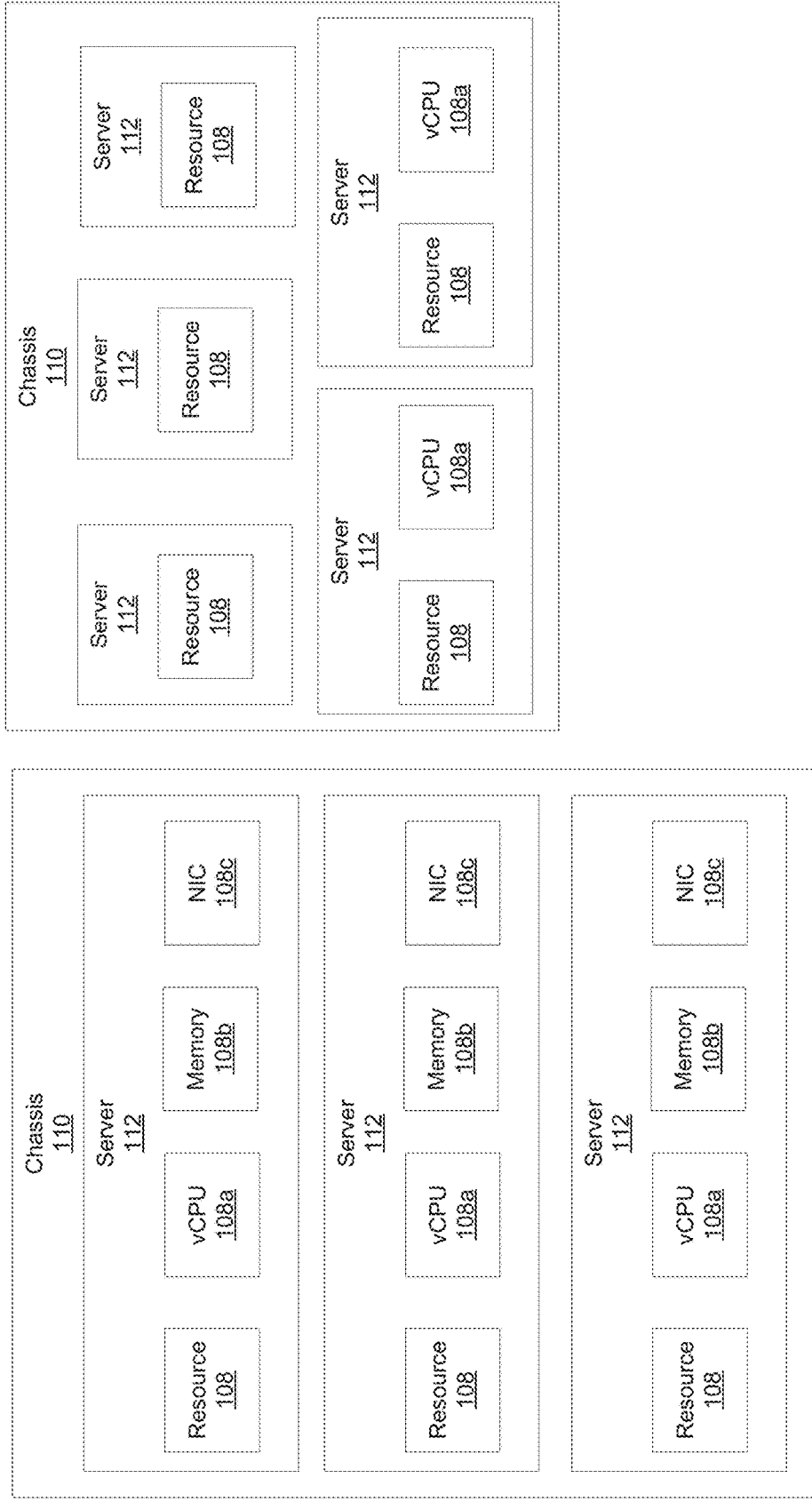
FIG. 15 is a representation of an exemplary hardware platform for a network.

While FIG. 14 illustrates resources collectively contained in hardware platform 911, the configuration of hardware platform 911 may isolate, for example, certain memory 108b from other memory 108b FIG. 15 provides an exemplary implementation of hardware platform 910.

Hardware platform 911 may comprise one or more chasses 110. Chassis 110 may refer to the physical housing or platform for multiple servers 112 or other network equipment. In an aspect, chassis 110 may also refer to the underlying network equipment. Chassis 110 may include one or more servers 112. Server 112 may comprise general purpose computer hardware or a computer. In an aspect, chassis 110 may comprise a metal rack, and servers 112 of chassis 110 may comprise blade servers that are physically mounted in or on chassis 110.

Each server 112 may include one or more network resources 108, as illustrated. Servers 112 may be communicatively coupled together (not shown) in any combination or arrangement. For example, all servers 112 within a given chassis 110 may be communicatively coupled. As another example, servers 112 in different chasses 110 may be communicatively coupled. Additionally or alternatively, chasses 110 may be communicatively coupled together (not shown) in any combination or arrangement.

The characteristics of each chassis 110 and each server 112 may differ. For example, FIG. 15 illustrates that the number of servers 112 within two chasses 110 may vary. Additionally or alternatively, the type or number of resources 108 within each server 112 may vary. In an aspect, chassis 110 may be used to group servers 112 with the same resource characteristics. In another aspect, servers 112 within the same chassis 110 may have different resource characteristics.

Given hardware platform 911, the number of sessions that may be instantiated may vary depending upon how efficiently resources 108 are assigned to different VMs 106. For example, assignment of VMs 106 to particular resources 108 may be constrained by one or more rules. For example, a first rule may require that resources 108 assigned to a particular VM 106 be on the same server 112 or set of servers 112. For example, if VM 106 uses eight vCPUs 108a, 1 GB of memory 108b, and 2 NICs 108c, the rules may require that all of these resources 108 be sourced from the same server 112. Additionally or alternatively, VM 106 may require splitting resources 108 among multiple servers 112, but such splitting may need to conform with certain restrictions. For example, resources 108 for VM 106 may be able to be split between two servers 112. Default rules may apply. For example, a default rule may require that all resources 108 for a given VM 106 must come from the same server 112.

An affinity rule may restrict assignment of resources 108 for a particular VM 106 (or a particular type of VM 106). For example, an affinity rule may require that certain VMs 106 be instantiated on (that is, consume resources from) the same server 112 or chassis 110. For example, if VNF 102 uses six MCM VMs 106, an affinity rule may dictate that those six MCM VMs 106 be instantiated on the same server 112 (or chassis 110). As another example, if VNF 102 uses MCM VMs 106, ASM VMs 106, and a third type of VMs 106, an affinity rule may dictate that at least the MCM VMs 106 and the ASM VMs 1046 be instantiated on the same server 112 (or chassis 110). Affinity rules may restrict assignment of resources 108 based on the identity or type of resource 108, VNF 102, VM 106, chassis 110, server 112, or any combination thereof.

An anti-affinity rule may restrict assignment of resources 108 for a particular VM 106 (or a particular type of VM 106). In contrast to an affinity rule—which may require that certain VMs 106 be instantiated on the same server 112 or chassis 110—an anti-affinity rule requires that certain VMs 106 be instantiated on different servers 112 (or different chasses 110). For example, an anti-affinity rule may require that MCM VM 106 be instantiated on a particular server 112 that does not contain any ASM VMs 106. As another example, an anti-affinity rule may require that MCM VMs 106 for a first VNF 102 be instantiated on a different server 112 (or chassis 110) than MCM VMs 106 for a second VNF 102. Anti-affinity rules may restrict assignment of resources 108 based on the identity or type of resource 108, VNF 102, VM 106, chassis 110, server 112, or any combination thereof.

Within these constraints, resources 108 of servers 112 may be assigned to be used to instantiate VMs 106, which in turn may be used to instantiate VNFs 102, which in turn may be used to establish sessions. The different combinations for how such resources 108 may be assigned may vary in complexity and efficiency. For example, different assignments may have different limits of the number of sessions that can be established given a particular server 112.

For example, consider a session that may require gateway VNF 102a and PCRF VNF 102b. Gateway VNF 102a may require five VMs 106 instantiated on the same server 112, and PCRF VNF 102b may require two VMs 104 instantiated on the same server 112. (Assume, for this example, that no affinity or anti-affinity rules restrict whether VMs 106 for PCRF VNF 102b may or must be instantiated on the same or different server 112 than VMs 106 for gateway VNF 102a.) In this example, each of two servers 112 may have sufficient resources 108 to support 10 VMs 106. To implement sessions using these two servers 112, first server 112 may be instantiated with 10 VMs 106 to support two instantiations of gateway VNF 102a, and second server 112 may be instantiated with 9 VMs: five VMs 106 to support one instantiation of gateway VNF 102a and four VMs 106 to support two instantiations of PCRF VNF 102b. This may leave the remaining resources 108 that could have supported the tenth VM 108 on second server 112 unused (and unusable for an instantiation of either a gateway VNF 102a or a PCRF VNF 102b). Alternatively, first server 112 may be instantiated with 10 VMs 106 for two instantiations of gateway VNF 102a and second server 112 may be instantiated with 10 VMs 106 for five instantiations of PCRF VNF 102b, using all available resources 108 to maximize the number of VMs 106 instantiated.

Consider, further, how many sessions each gateway VNF 102a and each PCRF VNF 102b may support. This may factor into which assignment of resources 108 is more efficient. For example, consider if each gateway VNF 102a supports two million sessions, and if each PCRF VNF 102b supports three million sessions. For the first configuration—three total gateway VNFs 102a (which satisfy the gateway requirement for six million sessions) and two total PCRF VNFs 102b (which satisfy the PCRF requirement for six million sessions)—would support a total of six million sessions. For the second configuration—two total gateway VNFs 102a (which satisfy the gateway requirement for four million sessions) and five total PCRF VNFs 102b (which satisfy the PCRF requirement for 15 million sessions)—would support a total of four million sessions. Thus, while the first configuration may seem less efficient looking only at the number of available resources 108 used (as resources 108 for the tenth possible VM 106 are unused), the second configuration is actually more efficient from the perspective of being the configuration that can support the greater number of sessions.

To solve the problem of determining a capacity (or, number of sessions) that can be supported by a given hardware platform 911, a given requirement for VNFs 102 to support a session, a capacity for the number of sessions each VNF 102 (e.g., of a certain type) can support, a given requirement for VMs 106 for each VNF 102 (e.g., of a certain type), a given requirement for resources 108 to support each VM 106 (e.g., of a certain type), rules dictating the assignment of resources 108 to one or more VMs 106 (e.g., affinity and anti-affinity rules), the chasses 110 and servers 112 of hardware platform 911, and the individual resources 108 of each chassis 110 or server 112 (e.g., of a certain type), an integer programming problem may be formulated.

First, a plurality of index sets may be established. For example, index set L may include the set of chasses 110. For example, if a system allows up to 6 chasses 110, this set may be:
L={1, 2, 3, 4, 5, 6},
where l is an element of L.

Another index set J may include the set of servers 112. For example, if a system allows up to 16 servers 112 per chassis 110, this set may be:
J={1, 2, 3, . . . , 16},
where j is an element of J As another example, index set K having at least one element k may include the set of VNFs 102 that may be considered. For example, this index set may include all types of VNFs 102 that may be used to instantiate a service. For example, let
K={GW, PCRF}
where GW represents gateway VNFs 102a and PCRF represents PCRF VNFs 102b.

Another index set I(k) may equal the set of VMs 106 for a VNF 102 k. Thus, let
I(GW)={MCM, ASM, IOM, WSM, CCM, DCM}
represent VMs 106 for gateway VNF 102a, where MCM represents MCM VM 106, ASM represents ASM VM 106, and each of IOM, WSM, CCM, and DCM represents a respective type of VM 106. Further, let
I(PCRF)={DEP, DIR, POL, SES, MAN}
represent VMs 106 for PCRF VNF 102b, where DEP represents DEP VM 106 and each of DIR, POL, SES, and MAN represent a respective type of VM 106.

Another index set V may include the set of possible instances of a given VM 104. For example, if a system allows up to 20 instances of VMs 106, this set may be:
V={1, 2, 3, . . . , 20},
where v is an element of V.

In addition to the sets, the integer programming problem may include additional data. The characteristics of VNFs 102, VMs 106, chasses 110, or servers 112 may be factored into the problem. This data may be referred to as parameters. For example, for given VNF 102 k, the number of sessions that VNF 102 k can support may be defined as a function S(k). In an aspect, for an element k of set K, this parameter may be represented by
$S(k)>=0$;
as a measurement of the number of sessions k can support. Returning to the earlier example where gateway VNF 102a may support 2 million sessions, then this parameter may be S(GW)=2,000,000.

VM 106 modularity may be another parameter in the integer programming problem. VM 106 modularity may represent the VM 106 requirement for a type of VNF 102. For example, for k that is an element of set K and i that is an element of set I, each instance of VNF k may require M(k, i) instances of VMs 106. For example, recall the example where
I(GW)={MCM, ASM, IOM, WSM, CCM, DCM}.
In an example, M(GW, I(GW)) may be the set that indicates the number of each type of VM 106 that may be required to instantiate gateway VNF 102a. For example,
M(GW, I(GW))={2, 16, 4, 4, 2, 4}
may indicate that one instantiation of gateway VNF 102a may require two instantiations of MCM VMs 106, 16 instantiations of ACM VM 106, four instantiations of IOM VM 106, four instantiations of WSM VM 106, two instantiations of CCM VM 106, and four instantiations of DCM VM 106.

Another parameter may indicate the capacity of hardware platform 910. For example, a parameter C may indicate the number of vCPUs 108a required for each VM 106 type i and for each VNF 102 type k. For example, this may include the parameter
C(k, i).

For example, if MCM VM 106 for gateway VNF 102a requires 20 vCPUs 108a, this may be represented as C(GW, MCM)=20.

However, given the complexity of the integer programming problem—the numerous variables and restrictions that must be satisfied—implementing an algorithm that may be used to solve the integer programming problem efficiently, without sacrificing optimality, may be difficult.

Figure 16:
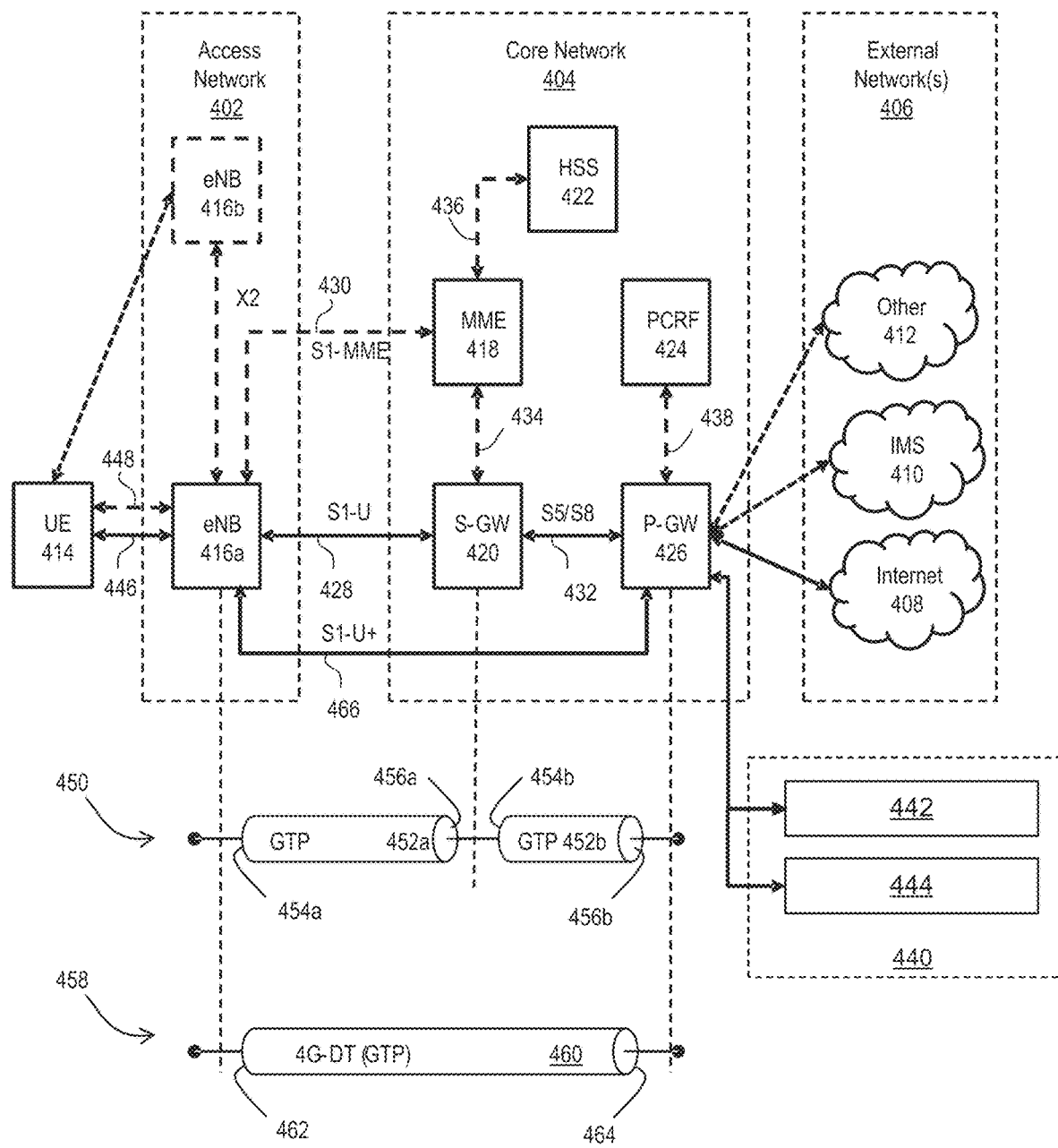
FIG. 16 is an illustration of a functional block diagram depicting one example of a Long Term Evolution-Evolved Packet System (LTE-EPS) network architecture.

FIG. 16 illustrates a functional block diagram depicting one example of an LTE-EPS network architecture 400 that may be at least partially implemented as an SDN. Network architecture 400 disclosed herein is referred to as a modified Long Term Evolution/Evolved Packet System (LTE-EPS) architecture 400 to distinguish it from a traditional LTE-EPS architecture.

An example modified LTE-EPS architecture 400 is based at least in part on standards developed by the 3rd Generation Partnership Project (3GPP), with information available at www.3gpp.org. LTE-EPS network architecture 400 may include an access network 402, a core network 404, e.g., an Evolved Packet Core (EPC) or Common BackBone (CBB) and one or more external networks 406, sometimes referred to as Packet Data Network (PDN) or peer entities. Different external networks 406 can be distinguished from each other by a respective network identifier, e.g., a label according to Domain Name Server (DNS) naming conventions describing an access point to the PDN. Such labels can be referred to as Access Point Names (APN). External networks 406 can include one or more trusted and non-trusted external networks such as an internet protocol (IP) network 408, an IP multimedia subsystem (IMS) network 410, and other networks 412, such as a service network, a corporate network, or the like. In an aspect, access network 402, core network 404, or external network 406 may include or communicate with network 100.

Access network 402 can include an LTE network architecture sometimes referred to as Evolved Universal mobile Telecommunication system Terrestrial Radio Access (E UTRA) and evolved UMTS Terrestrial Radio Access Network (E-UTRAN). Broadly, access network 402 can include one or more communication devices, commonly referred to as User Equipment (UE) 414, and one or more wireless access nodes, or base stations 416a, 416b. During network operations, at least one base station 416 communicates directly with UE 414. Base station 416 can be an evolved Node B (e-NodeB), with which UE 414 communicates over the air and wirelessly. UEs 414 can include, without limitation, wireless devices, e.g., satellite communication systems, portable digital assistants (PDAs), laptop computers, tablet devices and other mobile devices (e.g., cellular telephones, smart appliances, and so on). UEs 414 can connect to eNBs 416 when UE 414 is within range according to a corresponding wireless communication technology.

UE 414 generally runs one or more applications that engage in a transfer of packets between UE 414 and one or more external networks 406. Such packet transfers can include one of downlink packet transfers from external network 406 to UE 414, uplink packet transfers from UE 414 to external network 406 or combinations of uplink and downlink packet transfers. Applications can include, without limitation, web browsing, Voice over IP (VoIP), streaming media and the like. Each application can pose different Quality of Service (QoS) requirements on a respective packet transfer. Different packet transfers can be served by different bearers within core network 404, e.g., according to parameters, such as the QoS.

Core network 404 uses a concept of bearers, e.g., EPS bearers (virtual connections between UEs and Packet Gateways, PGWs), to route packets, e.g., IP traffic, between a particular gateway in core network 404 and UE 414. A bearer refers generally to an IP packet flow with a defined QoS between the particular gateway and UE 414. Access network 402, e.g., E UTRAN, and core network 404 together set up and release bearers as required by the various applications. Bearers can be classified in at least two different categories: (i) minimum guaranteed bit rate bearers, e.g., for applications, such as Voice Over IP (VoIP); and (ii) non-guaranteed bit rate bearers that do not require guarantee bit rate, e.g., for applications, such as web browsing.

In one embodiment, the core network 404 includes various network entities, such as Mobility Management Entity (MME) 418, Serving Gateway (SGW) 420, Home Subscriber Server (HSS) 422, Policy and Charging Rules Function (PCRF) 424 and Packet Data Network Gateway (PGW) 426. In one embodiment, MME 418 comprises a control node performing a control signaling between various equipment and devices in access network 402 and core network 404. The protocols running between UE 414 and core network 404 are generally known as Non-Access Stratum (NAS) protocols.

For illustration purposes only, the terms MME 418, SGW 420, HSS 422 and PGW 426, and so on, can be server devices, but may be referred to in the subject disclosure without the word "server." It is also understood that any form of such servers can operate in a device, system, component, or other form of centralized or distributed hardware and software. It is further noted that these terms and other terms such as bearer paths and/or interfaces are terms that can include features, methodologies, and/or fields that may be described in whole or in part by standards bodies such as the 3GPP. It is further noted that some or all embodiments of the subject disclosure may in whole or in part modify, supplement, or otherwise supersede final or proposed standards published and promulgated by 3GPP.

According to traditional implementations of LTE-EPS architectures, SGW 420 routes and forwards all user data packets. SGW 420 also acts as a mobility anchor for user plane operation during handovers between base stations, e.g., during a handover from first eNB 416a to second eNB 416b as may be the result of UE 414 moving from one area of coverage, e.g., cell, to another. SGW 420 can also terminate a downlink data path, e.g., from external network 406 to UE 414 in an idle state, and trigger a paging operation when downlink data arrives for UE 414. SGW 420 can also be configured to manage and store a context for UE 414, e.g., including one or more of parameters of the IP bearer service and network internal routing information. In addition, SGW 420 can perform administrative functions, e.g., in a visited network, such as collecting information for charging (e.g., the volume of data sent to or received from the user), and/or replicate user traffic, e.g., to support a lawful interception. SGW 420 also serves as the mobility anchor for interworking with other 3GPP technologies such as universal mobile telecommunication system (UMTS).

At any given time, UE 414 is generally in one of three different states: detached, idle, or active. The detached state is typically a transitory state in which UE 414 is powered on but is engaged in a process of searching and registering with network 402. In the active state, UE 414 is registered with access network 402 and has established a wireless connection, e.g., radio resource control (RRC) connection, with eNB 416. Whether UE 414 is in an active state can depend on the state of a packet data session, and whether there is an active packet data session. In the idle state, UE 414 is generally in a power conservation state in which UE 414 typically does not communicate packets. When UE 414 is idle, SGW 420 can terminate a downlink data path, e.g., from one peer entity 406, and triggers paging of UE 414 when data arrives for UE 414. If UE 414 responds to the page, SGW 420 can forward the IP packet to eNB 416a.

HSS 422 can manage subscription-related information for a user of UE 414. For example, HSS 422 can store information such as authorization of the user, security requirements for the user, quality of service (QoS) requirements for the user, etc. HSS 422 can also hold information about external networks 406 to which the user can connect, e.g., in the form of an APN of external networks 406. For example, MME 418 can communicate with HSS 422 to determine if UE 414 is authorized to establish a call, e.g., a voice over IP (VoIP) call before the call is established.

PCRF 424 can perform QoS management functions and policy control. PCRF 424 is responsible for policy control decision-making, as well as for controlling the flow-based charging functionalities in a policy control enforcement function (PCEF), which resides in PGW 426. PCRF 424 provides the QoS authorization, e.g., QoS class identifier and bit rates that decide how a certain data flow will be treated in the PCEF and ensures that this is in accordance with the user's subscription profile.

PGW 426 can provide connectivity between the UE 414 and one or more of the external networks 406. In illustrative network architecture 400, PGW 426 can be responsible for IP address allocation for UE 414, as well as one or more of QoS enforcement and flow-based charging, e.g., according to rules from the PCRF 424. PGW 426 is also typically responsible for filtering downlink user IP packets into the different QoS-based bearers. In at least some embodiments, such filtering can be performed based on traffic flow templates. PGW 426 can also perform QoS enforcement, e.g., for guaranteed bit rate bearers. PGW 426 also serves as a mobility anchor for interworking with non-3GPP technologies such as CDMA2000.

Within access network 402 and core network 404 there may be various bearer paths/interfaces, e.g., represented by solid lines 428 and 430. Some of the bearer paths can be referred to by a specific label. For example, solid line 428 can be considered an S1-U bearer and solid line 432 can be considered an S5/S8 bearer according to LTE-EPS architecture standards. Without limitation, reference to various interfaces, such as S1, X2, S5, S8, S11 refer to EPS interfaces. In some instances, such interface designations are combined with a suffix, e.g., a "U" or a "C" to signify whether the interface relates to a "User plane" or a "Control plane." In addition, the core network 404 can include various signaling bearer paths/interfaces, e.g., control plane paths/interfaces represented by dashed lines 430, 434, 436, and 438. Some of the signaling bearer paths may be referred to by a specific label. For example, dashed line 430 can be considered as an S1-MME signaling bearer, dashed line 434 can be considered as an S11 signaling bearer and dashed line 436 can be considered as an S6a signaling bearer, e.g., according to LTE-EPS architecture standards. The above bearer paths and signaling bearer paths are only illustrated as examples and it should be noted that additional bearer paths and signaling bearer paths may exist that are not illustrated.

Also shown is a novel user plane path/interface, referred to as the S1-U+ interface 466. In the illustrative example, the S1-U+ user plane interface extends between the eNB 416a and PGW 426. Notably, S1-U+ path/interface does not include SGW 420, a node that is otherwise instrumental in configuring and/or managing packet forwarding between eNB 416a and one or more external networks 406 by way of PGW 426. As disclosed herein, the S1-U+ path/interface facilitates autonomous learning of peer transport layer addresses by one or more of the network nodes to facilitate a self-configuring of the packet forwarding path. In particular, such self-configuring can be accomplished during handovers in most scenarios so as to reduce any extra signaling load on the S/PGWs 420, 426 due to excessive handover events.

In some embodiments, PGW 426 is coupled to storage device 440, shown in phantom. Storage device 440 can be integral to one of the network nodes, such as PGW 426, for example, in the form of internal memory and/or disk drive. It is understood that storage device 440 can include registers suitable for storing address values. Alternatively or in addition, storage device 440 can be separate from PGW 426, for example, as an external hard drive, a flash drive, and/or network storage.

Storage device 440 selectively stores one or more values relevant to the forwarding of packet data. For example, storage device 440 can store identities and/or addresses of network entities, such as any of network nodes 418, 420, 422, 424, and 426, eNBs 416 and/or UE 414. In the illustrative example, storage device 440 includes a first storage location 442 and a second storage location 444. First storage location 442 can be dedicated to storing a Currently Used Downlink address value 442. Likewise, second storage location 444 can be dedicated to storing a Default Downlink Forwarding address value 444. PGW 426 can read and/or write values into either of storage locations 442, 444, for example, managing Currently Used Downlink Forwarding address value 442 and Default Downlink Forwarding address value 444 as disclosed herein.

In some embodiments, the Default Downlink Forwarding address for each EPS bearer is the SGW S5-U address for each EPS Bearer. The "Currently Used Downlink Forwarding address" for each EPS bearer in PGW 426 can be set every time when PGW 426 receives an uplink packet, e.g., a GTP-U uplink packet, with a new source address for a corresponding EPS bearer. When UE 414 is in an idle state, the "Currently Used Downlink Forwarding address" field for each EPS bearer of UE 414 can be set to a "null" or other suitable value.

In some embodiments, the Default Downlink Forwarding address is only updated when PGW 426 receives a new SGW S5-U address in a predetermined message or messages. For example, the Default Downlink Forwarding address is only updated when PGW 426 receives one of a Create Session Request, Modify Bearer Request and Create Bearer Response messages from SGW 420.

As values 442, 444 can be maintained and otherwise manipulated on a per bearer basis, it is understood that the storage locations can take the form of tables, spreadsheets, lists, and/or other data structures generally well understood and suitable for maintaining and/or otherwise manipulate forwarding addresses on a per bearer basis.

It should be noted that access network 402 and core network 404 are illustrated in a simplified block diagram in FIG. 16. In other words, either or both of access network 402 and the core network 404 can include additional network elements that are not shown, such as various routers, switches and controllers. In addition, although FIG. 16 illustrates only a single one of each of the various network elements, it should be noted that access network 402 and core network 404 can include any number of the various network elements. For example, core network 404 can include a pool (i.e., more than one) of MMEs 418, SGWs 420 or PGWs 426.

In the illustrative example, data traversing a network path between UE 414, eNB 416a, SGW 420, PGW 426 and external network 406 may be considered to constitute data transferred according to an end-to-end IP service. However, for the present disclosure, to properly perform establishment management in LTE-EPS network architecture 400, the core network, data bearer portion of the end-to-end IP service is analyzed.

An establishment may be defined herein as a connection set up request between any two elements within LTE-EPS network architecture 400. The connection set up request may be for user data or for signaling. A failed establishment may be defined as a connection set up request that was unsuccessful. A successful establishment may be defined as a connection set up request that was successful.

In one embodiment, a data bearer portion comprises a first portion (e.g., a data radio bearer 446) between UE 414 and eNB 416a, a second portion (e.g., an S1 data bearer 428) between eNB 416a and SGW 420, and a third portion (e.g., an S5/S8 bearer 432) between SGW 420 and PGW 426. Various signaling bearer portions are also illustrated in FIG. 16. For example, a first signaling portion (e.g., a signaling radio bearer 448) between UE 414 and eNB 416a, and a second signaling portion (e.g., S1 signaling bearer 430) between eNB 416a and MME 418.

In at least some embodiments, the data bearer can include tunneling, e.g., IP tunneling, by which data packets can be forwarded in an encapsulated manner, between tunnel endpoints. Tunnels, or tunnel connections can be identified in one or more nodes of network 100, e.g., by one or more of tunnel endpoint identifiers, an IP address and a user datagram protocol port number. Within a particular tunnel connection, payloads, e.g., packet data, which may or may not include protocol related information, are forwarded between tunnel endpoints.

An example of first tunnel solution 450 includes a first tunnel 452a between two tunnel endpoints 454a and 456a, and a second tunnel 452b between two tunnel endpoints 454b and 456b. In the illustrative example, first tunnel 452a is established between evolved Node B (eNodeB, eNB) 416a and SGW 420. Accordingly, first tunnel 452a includes a first tunnel endpoint 454a corresponding to an S1-U address of eNB 416a (referred to herein as the eNB S1-U address), and second tunnel endpoint 456a corresponding to an S1-U address of SGW 420 (referred to herein as the SGW S1-U address). Likewise, second tunnel 452b includes first tunnel endpoint 454b corresponding to an S5-U address of SGW 420 (referred to herein as the SGW S5-U address), and second tunnel endpoint 456b corresponding to an S5-U address of PGW 426 (referred to herein as the PGW S5-U address).

In at least some embodiments, first tunnel solution 450 is referred to as a two tunnel solution, e.g., according to the General Packet Radio Service (GPRS) Tunneling Protocol User Plane (GTPv1-U based), as described in 3GPP specification TS 29.281, incorporated herein in its entirety. It is understood that one or more tunnels are permitted between each set of tunnel end points. For example, each subscriber can have one or more tunnels, e.g., one for each Packet Data Protocol (PDP) context that they have active, as well as possibly having separate tunnels for specific connections with different quality of service requirements, and so on.

An example of second tunnel solution 458 includes a single or direct tunnel 460 between tunnel endpoints 462 and 464. In the illustrative example, direct tunnel 460 is established between eNB 416a and PGW 426, without subjecting packet transfers to processing related to SGW 420. Accordingly, direct tunnel 460 includes first tunnel endpoint 462 corresponding to the eNB S1-U address, and second tunnel endpoint 464 corresponding to the PGW S5-U address. Packet data received at either end can be encapsulated into a payload and directed to the corresponding address of the other end of the tunnel. Such direct tunneling avoids processing, e.g., by SGW 420 that would otherwise relay packets between the same two endpoints, e.g., according to a protocol, such as the GTP-U protocol.

In some scenarios, direct tunneling solution 458 can forward user plane data packets between eNB 416a and PGW 426, by way of SGW 420. That is, SGW 420 can serve a relay function, by relaying packets between two tunnel endpoints 416a, 426. In other scenarios, direct tunneling solution 458 can forward user data packets between eNB 416a and PGW 426, by way of the S1 U+ interface 466, thereby bypassing SGW 420.

Generally, UE 414 can have one or more bearers at any one time. The number and types of bearers can depend on applications, default requirements, and so on. It is understood that the techniques disclosed herein, including the configuration, management and use of various tunnel solutions 450, 458, can be applied to the bearers on an individual bases. That is, if user data packets of one bearer, say a bearer associated with a VoIP service of UE 414, then the forwarding of all packets of that bearer are handled in a similar manner. Continuing with this example, the same UE 414 can have another bearer associated with it through the same eNB 416a. This other bearer, for example, can be associated with a relatively low rate data session forwarding user data packets through core network 404 simultaneously with the first bearer. Likewise, the user data packets of the other bearer are also handled in a similar manner, without necessarily following a forwarding path or solution of the first bearer. Thus, one of the bearers may be forwarded through direct tunnel 458; whereas, another one of the bearers may be forwarded through a two-tunnel solution 450.

Figure 17:
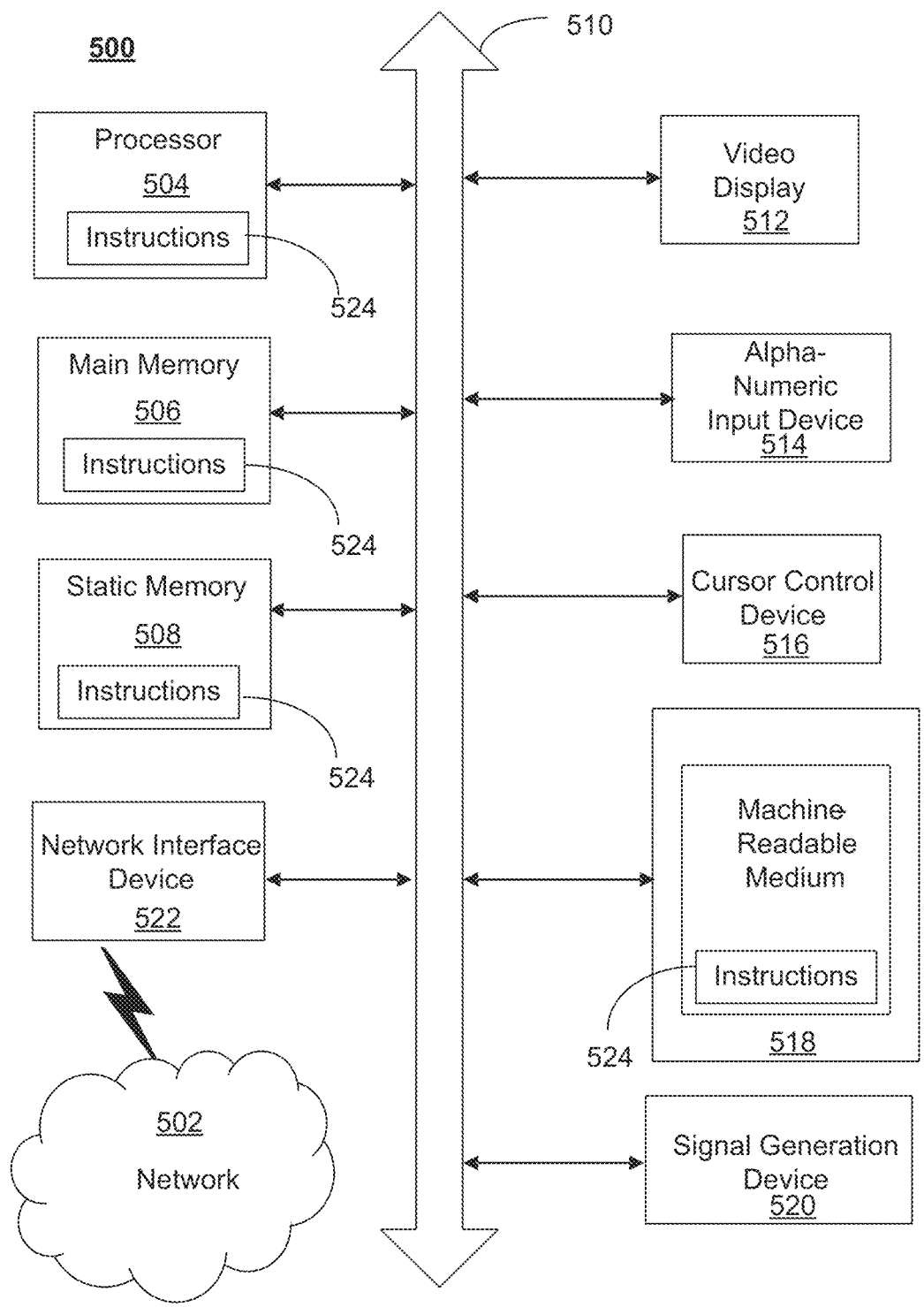
FIG. 17 depicts an exemplary diagrammatic representation of a machine in the form of a computer system.

FIG. 17 depicts an exemplary diagrammatic representation of a machine in the form of a computer system 500 within which a set of instructions, when executed, may cause the machine to perform any one or more of the methods described above. One or more instances of the machine can operate, for example, as processor 504 for UE 414, eNB 416, MME 418, SGW 420, HSS 422, PCRF 424, PGW 426 and other devices. In some embodiments, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the embodiments described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium 518 having instructions 524 on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

Figure 18:
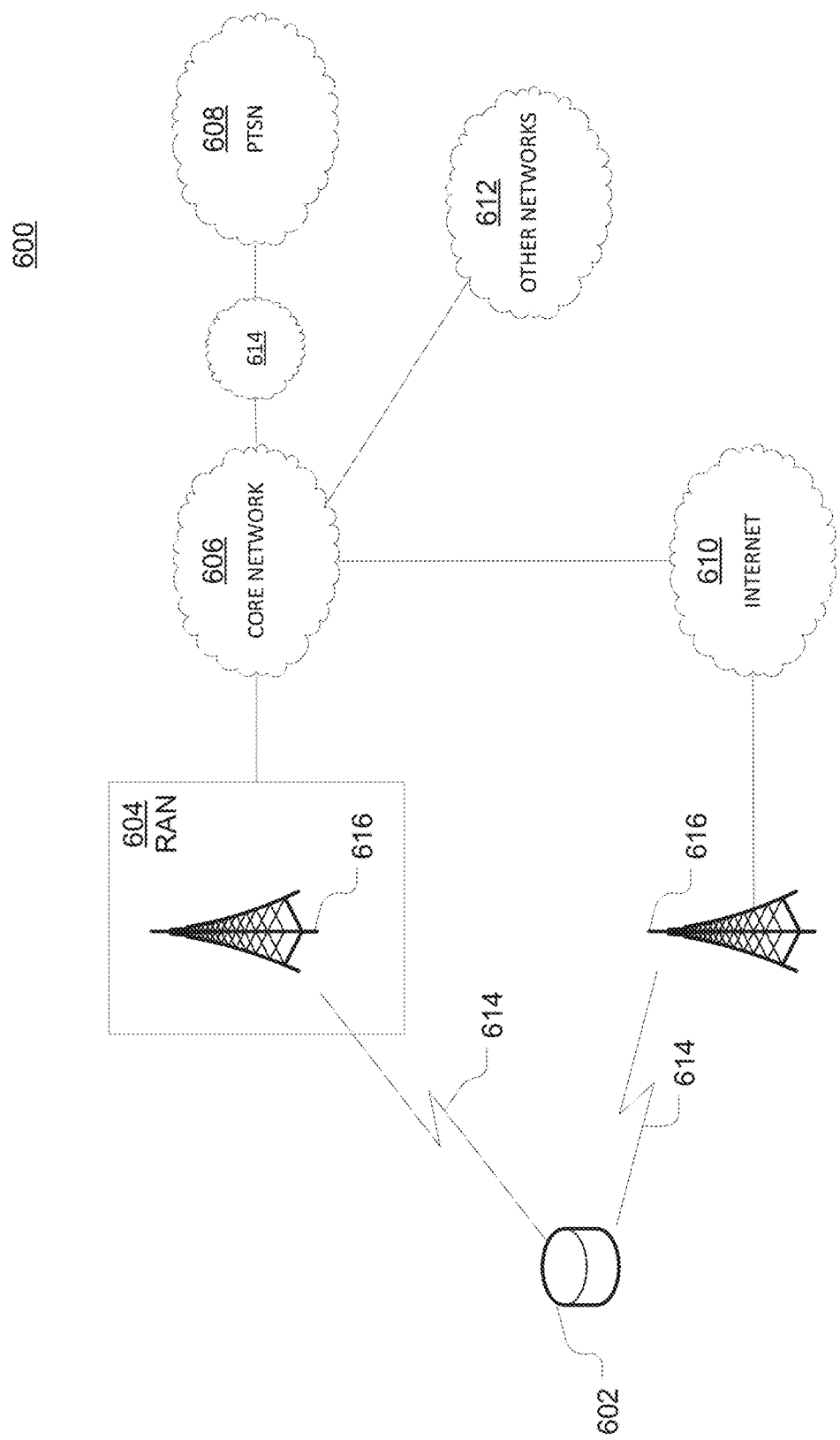
FIG. 18 illustrates a base station with a direct connection to Internet.

As shown in FIG. 18, telecommunication system 600 may include wireless transmit/receive units (WTRUs) 602, a Radio Access Network (RAN) 604, a core network 606, a public switched telephone network (PSTN) 608, the Internet 610, or other networks 612, though it will be appreciated that the disclosed examples contemplate any number of Wireless Transmit/Receive Units (WTRUs), base stations, networks, or network elements. Each WTRU 602 may be any type of device configured to operate or communicate in a wireless environment. For example, a WTRU may comprise a mobile device, network device or the like, or any combination thereof. By way of example, WTRUs 602 may be configured to transmit or receive wireless signals and may include a UE, a mobile station, a mobile device, a fixed or mobile subscriber unit, a pager, a cellular telephone, a PDA, a smartphone, a laptop, a netbook, a personal computer, a wireless sensor, consumer electronics, or the like. WTRUs 602 may be configured to transmit or receive wireless signals over an air interface 614.

Telecommunication system 600 may also include one or more base stations 616. Each of base stations 616 may be any type of device configured to wirelessly interface with at least one of the WTRUs 602 to facilitate access to one or more communication networks, such as core network 606, PTSN 608, Internet 610, or other networks 612. By way of example, base stations 616 may be a base transceiver station (BTS), a Node-B, an eNode B, a Home Node B, a Home eNode B, a site controller, an access point (AP), a wireless router, or the like. While base stations 616 are each depicted as a single element, it will be appreciated that base stations 616 may include any number of interconnected base stations or network elements.

RAN 604 may include one or more base stations 616, along with other network elements (not shown), such as a base station controller (BSC), a radio network controller (RNC), or relay nodes. One or more base stations 616 may be configured to transmit or receive wireless signals within a particular geographic region, which may be referred to as a cell (not shown). The cell may further be divided into cell sectors. For example, the cell associated with base station 616 may be divided into three sectors such that base station 616 may include three transceivers: one for each sector of the cell. In another example, base station 616 may employ multiple-input multiple-output (MIMO) technology and, therefore, may utilize multiple transceivers for each sector of the cell.

Base stations 616 may communicate with one or more of WTRUs 602 over air interface 614, which may be any suitable wireless communication link (e.g., radio frequency (RF), microwave, infrared (IR), ultraviolet (UV), or visible light). Air interface 614 may be established using any suitable radio access technology (RAT).

More specifically, as noted above, telecommunication system 600 may be a multiple access system and may employ one or more channel access schemes, such as Code Division Multiple Access (CDMA), Time-Division Multiple Access (TDMA), Frequency Division Multiple Access (FDMA), Orthogonal FDMA (OFDMA), Single-Carrier FDMA (SC-FDMA), or the like. For example, base station 616 in RAN 604 and WTRUs 602 connected to RAN 604 may implement a radio technology such as Universal Mobile Telecommunications System (UMTS) Terrestrial Radio Access (UTRA) that may establish air interface 614 using wideband CDMA (WCDMA). WCDMA may include communication protocols, such as High-Speed Packet Access (HSPA) or Evolved HSPA (HSPA+). HSPA may include High-Speed Downlink Packet Access (HSDPA) or High-Speed Uplink Packet Access (HSUPA).

As another example base station 616 and WTRUs 602 that are connected to RAN 604 may implement a radio technology such as Evolved UMTS Terrestrial Radio Access (E-UTRA), which may establish air interface 614 using LTE or LTE-Advanced (LTE-A).

Optionally base station 616 and WTRUs 602 connected to RAN 604 may implement radio technologies such as IEEE 802.16 (i.e., Worldwide Interoperability for Microwave Access (WiMAX)), CDMA2000, CDMA2000 1x, CDMA2000 Evolution-Data Optimized (EV-DO), Interim Standard 2000 (IS-2000), Interim Standard 95 (IS-95), Interim Standard 856 (IS-856), GSM, Enhanced Data rates for GSM Evolution (EDGE), Global System for Mobile Communication (GSM) EDGE (GERAN), or the like.

Base station 616 may be a wireless router, Home Node B, Home eNode B, or access point, for example, and may utilize any suitable RAT for facilitating wireless connectivity in a localized area, such as a place of business, a home, a vehicle, a campus, or the like. For example, base station 616 and associated WTRUs 602 may implement a radio technology such as IEEE 802.11 to establish a wireless local area network (WLAN). As another example, base station 616 and associated WTRUs 602 may implement a radio technology such as IEEE 802.15 to establish a wireless personal area network (WPAN). In yet another example, base station 616 and associated WTRUs 602 may utilize a cellular-based RAT (e.g., WCDMA, CDMA2000, GSM, LTE, LTE-A, etc.) to establish a picocell or femtocell. As shown in FIG. 18, base station 616 may have a direct connection to Internet 610. Thus, base station 616 may not be required to access Internet 610 via core network 606.

RAN 604 may be in communication with core network 606, which may be any type of network configured to provide voice, data, applications, and/or voice over internet protocol (VoIP) services to one or more WTRUs 602. For example, core network 606 may provide call control, billing services, mobile location-based services, pre-paid calling, Internet connectivity, video distribution or high-level security functions, such as user authentication. Although not shown in FIG. 18, it will be appreciated that RAN 604 or core network 606 may be in direct or indirect communication with other RANs that employ the same RAT as RAN 604 or a different RAT. For example, in addition to being connected to RAN 604, which may be utilizing an E-UTRA radio technology, core network 606 may also be in communication with another RAN (not shown) employing a GSM radio technology.

Core network 606 may also serve as a gateway for WTRUs 602 to access PSTN 608, Internet 610, or other networks 612. PSTN 608 may include circuit-switched telephone networks that provide plain old telephone service (POTS). For LTE core networks, core network 606 may use IMS core 606 to provide access to PSTN 608. Internet 610 may include a global system of interconnected computer networks or devices that use common communication protocols, such as the transmission control protocol (TCP), user datagram protocol (UDP), or Internet Protocol (IP) in the TCP/IP internet protocol suite. Other networks 612 may include wired or wireless communications networks owned or operated by other service providers. For example, other networks 612 may include another core network connected to one or more RANs, which may employ the same RAT as RAN 604 or a different RAT.

Some or all WTRUs 602 in telecommunication system 600 may include multi-mode capabilities. That is, WTRUs 602 may include multiple transceivers for communicating with different wireless networks over different wireless links. For example, one or more WTRUs 602 may be configured to communicate with base station 616, which may employ a cellular-based radio technology, and with base station 616, which may employ an IEEE 802 radio technology.

Figure 19:
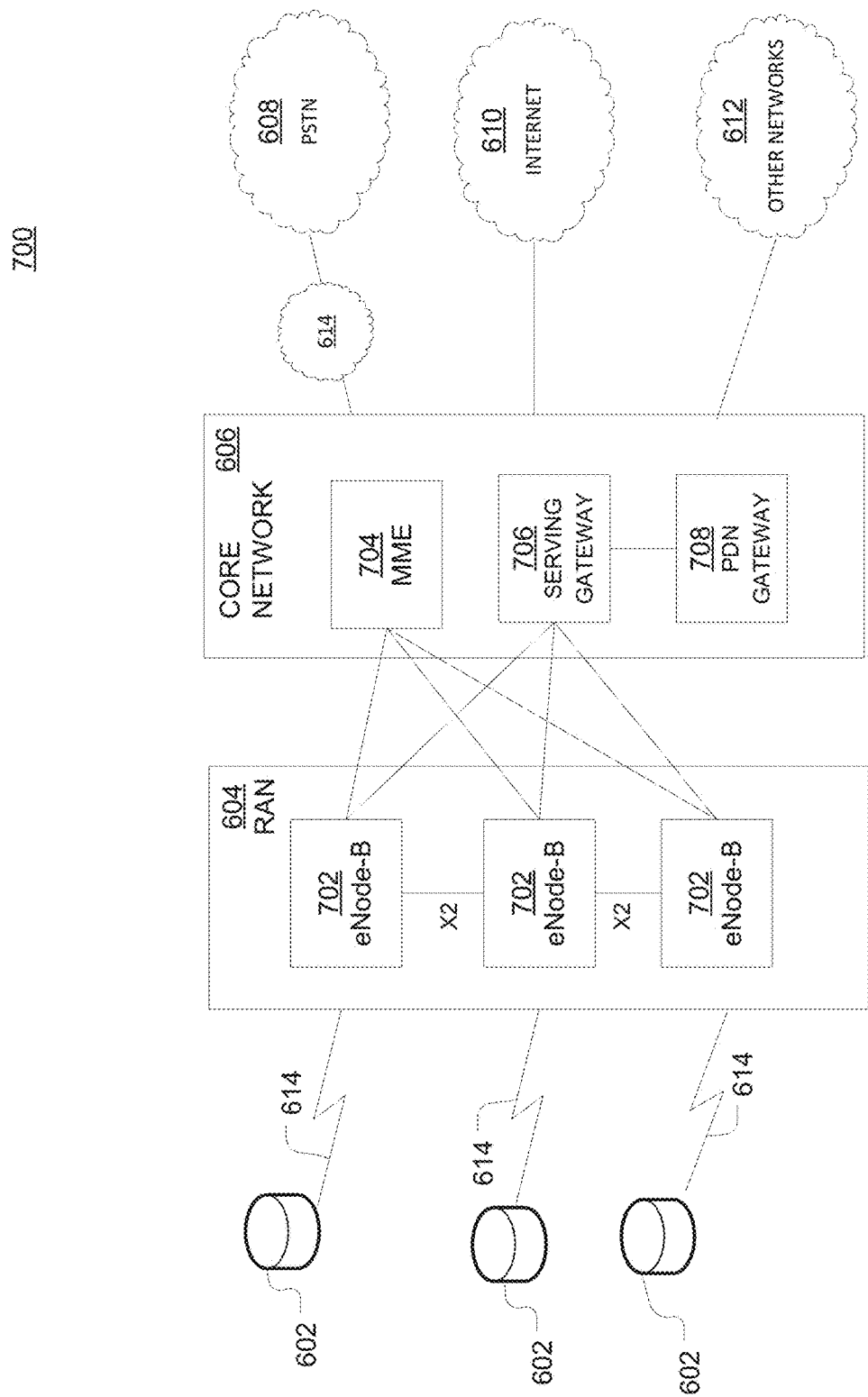
FIG. 19 is an example system including RAN and core network.

FIG. 19 is an example system 700 including RAN 604 and core network 606. As noted above, RAN 604 may employ an E-UTRA radio technology to communicate with WTRUs 602 over air interface 614. RAN 604 may also be in communication with core network 606.

RAN 604 may include any number of eNode-Bs 702 while remaining consistent with the disclosed technology. One or more eNode-Bs 702 may include one or more transceivers for communicating with the WTRUs 602 over air interface 614. Optionally, eNode-Bs 702 may implement MIMO technology. Thus, one of eNode-Bs 702, for example, may use multiple antennas to transmit wireless signals to, or receive wireless signals from, one of WTRUs 602.

Each of eNode-Bs 702 may be associated with a particular cell (not shown) and may be configured to handle radio resource management decisions, handover decisions, scheduling of users in the uplink or downlink, or the like. As shown in FIG. 19 eNode-Bs 702 may communicate with one another over an X2 interface.

Core network 606 shown in FIG. 19 may include a mobility management gateway or entity (MME) 704, a serving gateway 706, or a packet data network (PDN) gateway 708. While each of the foregoing elements are depicted as part of core network 606, it will be appreciated that any one of these elements may be owned or operated by an entity other than the core network operator.

MME 704 may be connected to each of eNode-Bs 702 in RAN 604 via an S1 interface and may serve as a control node. For example, MME 704 may be responsible for authenticating users of WTRUs 602, bearer activation or deactivation, selecting a particular serving gateway during an initial attach of WTRUs 602, or the like. MME 704 may also provide a control plane function for switching between RAN 604 and other RANs (not shown) that employ other radio technologies, such as GSM or Wideband CDMA (WCDMA).

Serving gateway 706 may be connected to each of eNode-Bs 702 in RAN 604 via the S1 interface. Serving gateway 706 may generally route or forward user data packets to or from the WTRUs 602. Serving gateway 706 may also perform other functions, such as anchoring user planes during inter-eNode B handovers, triggering paging when downlink data is available for WTRUs 602, managing or storing contexts of WTRUs 602, or the like.

Serving gateway 706 may also be connected to PDN gateway 708, which may provide WTRUs 602 with access to packet-switched networks, such as Internet 610, to facilitate communications between WTRUs 602 and IP-enabled devices.

Core network 606 may facilitate communications with other networks. For example, core network 606 may provide WTRUs 602 with access to circuit-switched networks, such as PSTN 608, such as through IMS core 606 to facilitate communications between WTRUs 602 and traditional landline communications devices. In addition, core network 606 may provide the WTRUs 602 with access to other networks 612, which may include other wired or wireless networks that are owned or operated by other service providers.

Figure 20:
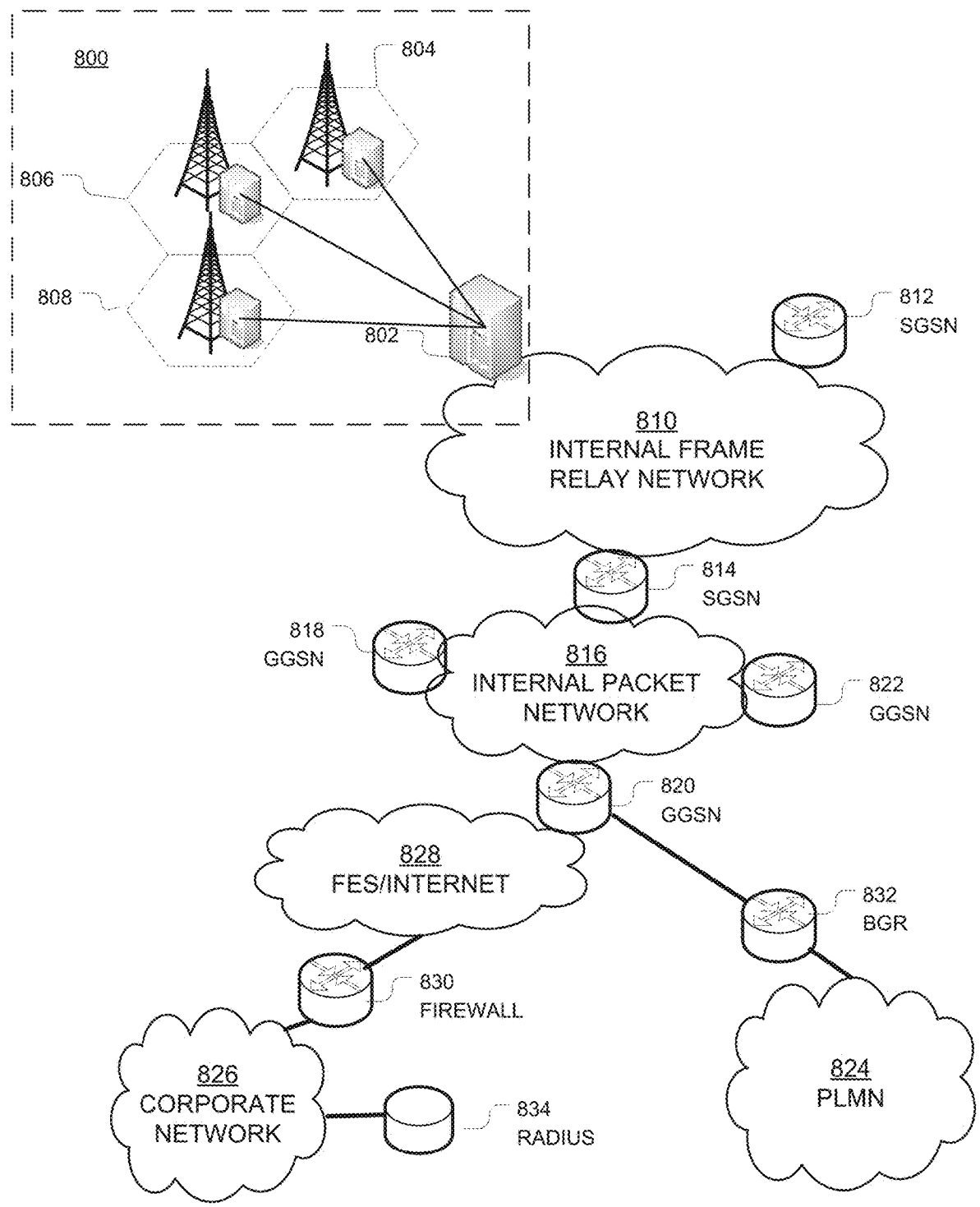
FIG. 20 illustrates an overall block diagram of an example packet-based mobile cellular network environment.

FIG. 20 depicts an overall block diagram of an example packet-based mobile cellular network environment, such as a GPRS network as described herein. In the example packet-based mobile cellular network environment shown in FIG. 20, there are a plurality of base station subsystems (BSS) 800 (only one is shown), each of which comprises a base station controller (BSC) 802 serving a plurality of Baseband Transceiver Stations (BTSs), such as BTSs 804, 806, 808. BTSs 804, 806, 808 are the access points where users of packet-based mobile devices become connected to the wireless network. In example fashion, the packet traffic originating from mobile devices is transported via an over-the-air interface to BTS 808, and from BTS 808 to BSC 802. Base station subsystems, such as BSS 800, are a part of internal frame relay network 810 that can include a Serving GPRS Support Node (SGSN), such as SGSN 812 or SGSN 814. Each SGSN 812, 814 is connected to an internal packet network 816 through which SGSN 812, 814 can route data packets to or from a plurality of gateway GPRS support nodes (GGSN) 818, 820, 822. As illustrated, SGSN 814 and GGSNs 818, 820, 822 are part of internal packet network 816. GGSNs 818, 820, 822 mainly provide an interface to external IP networks such as Public Land Mobile Network (PLMN) 824, corporate intranets/internets 826, or Fixed-End System (FES) or the public Internet 828. As illustrated, subscriber corporate network 826 may be connected to GGSN 820 via a firewall 830. PLMN 824 may be connected to GGSN 820 via a border gateway router (BGR) 832. A Remote Authentication Dial-In User Service (RADIUS) server 834 may be used for caller authentication when a user calls corporate network 826.

Generally, there may be a several cell sizes in a network, referred to as macro, micro, pico, femto or umbrella cells.

The coverage area of each cell is different in different environments. Macro cells can be regarded as cells in which the base station antenna is installed in a mast or a building above average roof top level. Micro cells are cells whose antenna height is under average roof top level. Micro cells are typically used in urban areas. Pico cells are small cells having a diameter of a few dozen meters. Pico cells are used mainly indoors. Femto cells have the same size as pico cells, but a smaller transport capacity. Femto cells are used indoors, in residential or small business environments. On the other hand, umbrella cells are used to cover shadowed regions of smaller cells and fill in gaps in coverage between those cells.

Figure 21:
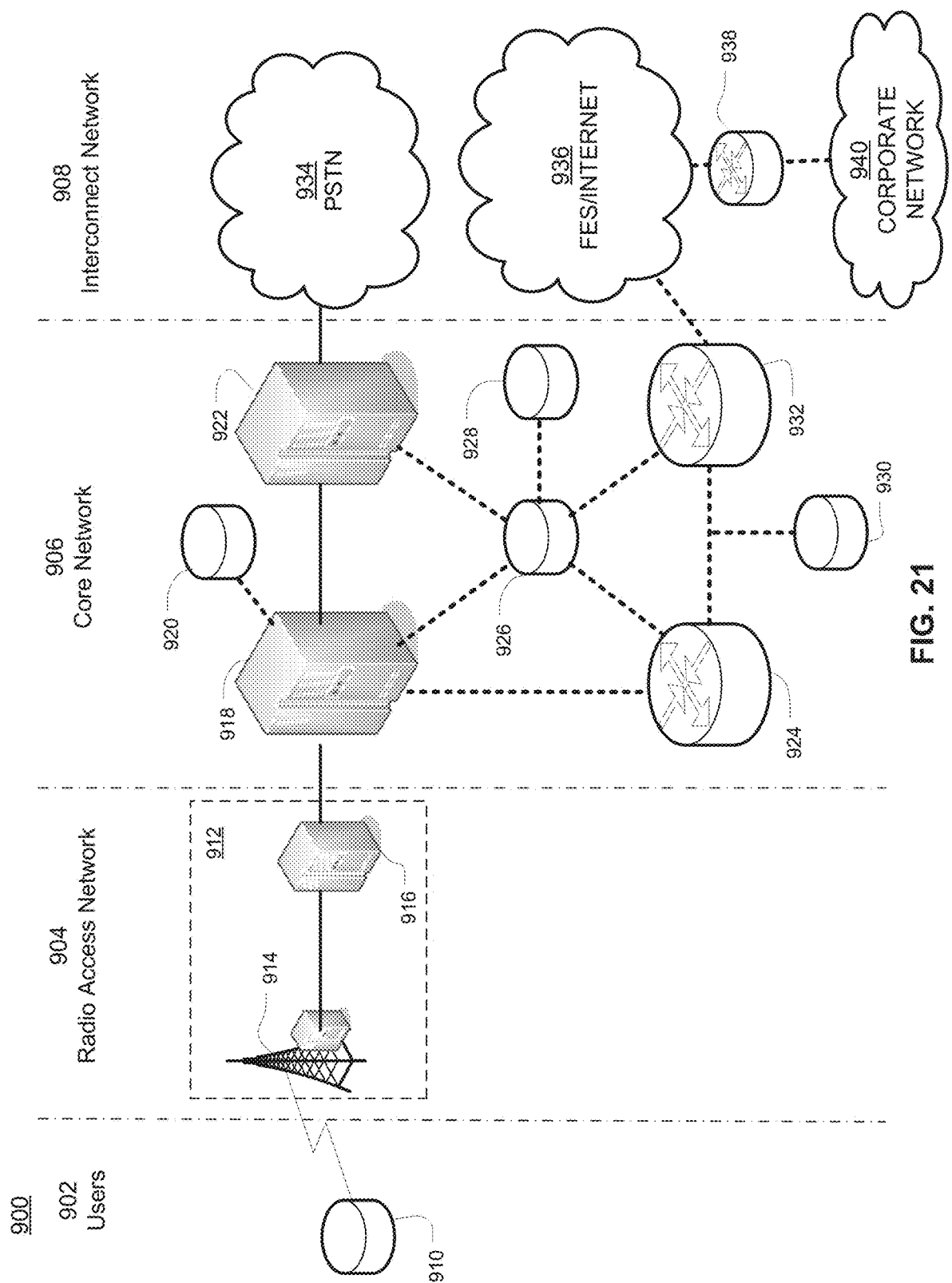
FIG. 21 illustrates an architecture of a typical General Packet Radio Service (GPRS) network.

FIG. 21 illustrates an architecture of a typical GPRS network 900 as described herein. The architecture depicted in FIG. 21 may be segmented into four groups: users 902, RAN 904, core network 906, and interconnect network 908. Users 902 comprise a plurality of end users, who each may use one or more devices 910. Note that device 910 is referred to as a mobile subscriber (MS) in the description of network shown in FIG. 21. In an example, device 910 comprises a communications device (e.g., mobile device 102, mobile positioning center 116, network device 300, any of detected devices 500, second device 508, access device 604, access device 606, access device 608, access device 610 or the like, or any combination thereof). Radio access network 904 comprises a plurality of BSSs such as BSS 912, which includes a BTS 914 and a BSC 916. Core network 906 may include a host of various network elements. As illustrated in FIG. 21, core network 906 may comprise MSC 918, service control point (SCP) 920, gateway MSC (GMSC) 922, SGSN 924, home location register (HLR) 926, authentication center (AuC) 928, domain name system (DNS) server 930, and GGSN 932. Interconnect network 908 may also comprise a host of various networks or other network elements. As illustrated in FIG. 21, interconnect network 908 comprises a PSTN 934, an FES/Internet 936, firewall 938, or a corporate network 940.

An MSC can be connected to a large number of BSCs. At MSC 918, for instance, depending on the type of traffic, the traffic may be separated in that voice may be sent to PSTN 934 through GMSC 922, or data may be sent to SGSN 924, which then sends the data traffic to GGSN 932 for further forwarding.

When MSC 918 receives call traffic, for example, from BSC 916, it sends a query to a database hosted by SCP 920, which processes the request and issues a response to MSC 918 so that it may continue call processing as appropriate.

Home Location Register (HLR) 926 is a centralized database for users to register to the GPRS network. HLR 926 stores static information about the subscribers such as the International Mobile Subscriber Identity (IMSI), subscribed services, or a key for authenticating the subscriber. HLR 926 also stores dynamic subscriber information such as the current location of the MS. Associated with HLR 926 is AuC 928, which is a database that contains the algorithms for authenticating subscribers and includes the associated keys for encryption to safeguard the user input for authentication.

In the following, depending on context, "mobile subscriber" or "MS" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 21, when MS 910 initiates the attach process by turning on the network capabilities of the mobile device, an attach request is sent by MS 910 to SGSN 924. The SGSN 924 queries another SGSN, to which MS 910 was attached before, for the identity of MS 910. Upon receiving the identity of MS 910 from the other SGSN, SGSN 924 requests more information from MS 910. This information is used to authenticate MS 910 together with the information provided by HLR 926. Once verified, SGSN 924 sends a location update to HLR 926 indicating the change of location to a new SGSN, in this case SGSN 924. HLR 926 notifies the old SGSN, to which MS 910 was attached before, to cancel the location process for MS 910. HLR 926 then notifies SGSN 924 that the location update has been performed. At this time, SGSN 924 sends an Attach Accept message to MS 910, which in turn sends an Attach Complete message to SGSN 924.

Next, MS 910 establishes a user session with the destination network, corporate network 940, by going through a Packet Data Protocol (PDP) activation process. Briefly, in the process, MS 910 requests access to the Access Point Name (APN), for example, UPS.com, and SGSN 924 receives the activation request from MS 910. SGSN 924 then initiates a DNS query to learn which GGSN 932 has access to the UPS.com APN. The DNS query is sent to a DNS server within core network 906, such as DNS server 930, which is provisioned to map to one or more GGSNs in core network 906. Based on the APN, the mapped GGSN 932 can access requested corporate network 940. SGSN 924 then sends to GGSN 932 a Create PDP Context Request message that contains necessary information. GGSN 932 sends a Create PDP Context Response message to SGSN 924, which then sends an Activate PDP Context Accept message to MS 910.

Once activated, data packets of the call made by MS 910 can then go through RAN 904, core network 906, and interconnect network 908, in a particular FES/Internet 936 and firewall 938, to reach corporate network 940.

Figure 22:
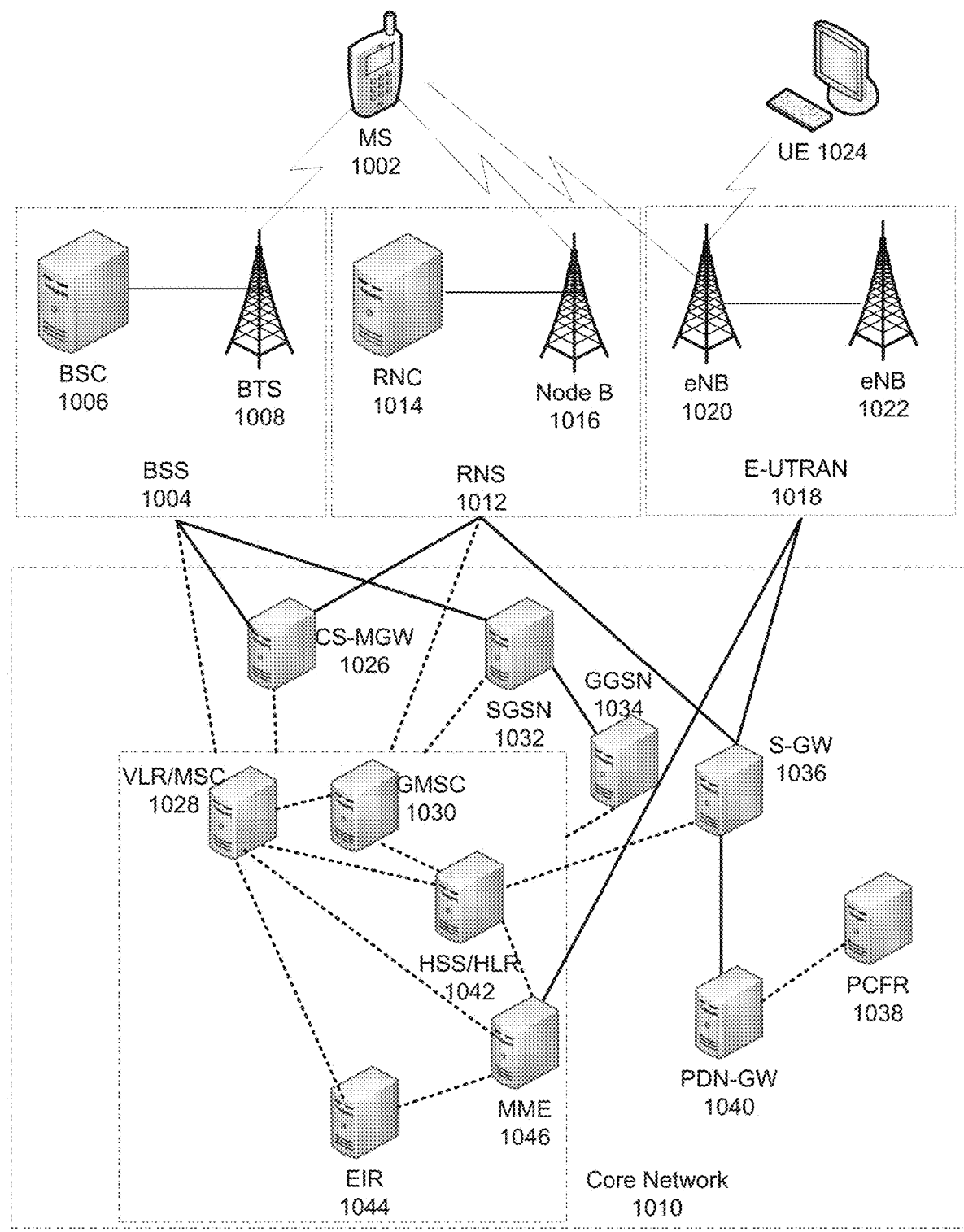
FIG. 22 illustrates a Public Land Mobile Network (PLMN) block diagram view of an example architecture that may be replaced by a telecommunications system.

FIG. 22 illustrates a PLMN block diagram view of an example architecture that may be replaced by a telecommunications system. In FIG. 22, solid lines may represent user traffic signals, and dashed lines may represent support signaling. MS 1002 is the physical equipment used by the PLMN subscriber. For example, network device or the like may serve as MS 1002. MS 1002 may be one of, but not limited to, a cellular telephone, a cellular telephone in combination with another electronic device or any other wireless mobile communication device.

MS 1002 may communicate wirelessly with BSS 1004. BSS 1004 contains BSC 1006 and a BTS 1008. BSS 1004 may include a single BSC 1006/BTS 1008 pair (base station) or a system of BSC/BTS pairs that are part of a larger network. BSS 1004 is responsible for communicating with MS 1002 and may support one or more cells. BSS 1004 is responsible for handling cellular traffic and signaling between MS 1002 and a core network 1010. Typically, BSS 1004 performs functions that include, but are not limited to, digital conversion of speech channels, allocation of channels to mobile devices, paging, or transmission/reception of cellular signals.

Additionally, MS 1002 may communicate wirelessly with RNS 1012. RNS 1012 contains a Radio Network Controller (RNC) 1014 and one or more Nodes B 1016. RNS 1012 may support one or more cells. RNS 1012 may also include one or more RNC 1014/Node B 1016 pairs or alternatively a single RNC 1014 may manage multiple Nodes B 1016. RNS 1012 is responsible for communicating with MS 1002 in its geographically defined area. RNC 1014 is responsible for controlling Nodes B 1016 that are connected to it and is a control element in a UMTS radio access network. RNC 1014 performs functions such as, but not limited to, load control, packet scheduling, handover control, security functions, or controlling MS 1002 access to core network 1010.

An E-UTRA Network (E-UTRAN) 1018 is a RAN that provides wireless data communications for MS 1002 and UE 1024. E-UTRAN 1018 provides higher data rates than traditional UMTS. It is part of the LTE upgrade for mobile networks, and later releases meet the requirements of the International Mobile Telecommunications (IMT) Advanced and are commonly known as a 4G networks. E-UTRAN 1018 may include of series of logical network components such as E-UTRAN Node B (eNB) 1020 and E-UTRAN Node B (eNB) 1022. E-UTRAN 1018 may contain one or more eNBs. User equipment (UE) 1024 may be any mobile device capable of connecting to E-UTRAN 1018 including, but not limited to, a personal computer, laptop, mobile device, wireless router, or other device capable of wireless connectivity to E-UTRAN 1018. The improved performance of the E-UTRAN 1018 relative to a typical UMTS network allows for increased bandwidth, spectral efficiency, and functionality including, but not limited to, voice, high-speed applications, large data transfer or IPTV, while still allowing for full mobility.

Typically MS 1002 may communicate with any or all of BSS 1004, RNS 1012, or E-UTRAN 1018. In an illustrative system, each of BSS 1004, RNS 1012, and E-UTRAN 1018 may provide MS 1002 with access to core network 1010. Core network 1010 may include of a series of devices that route data and communications between end users. Core network 1010 may provide network service functions to users in the circuit switched (CS) domain or the packet switched (PS) domain. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The circuit-switched Media Gateway (MGW) function (CS-MGW) 1026 is part of core network 1010, and interacts with VLR/MSC server 1028 and GMSC server 1030 in order to facilitate core network 1010 resource control in the CS domain. Functions of CS-MGW 1026 include, but are not limited to, media conversion, bearer control, payload processing or other mobile network processing such as handover or anchoring. CS-MGW 1026 may receive connections to MS 1002 through BSS 1004 or RNS 1012.

SGSN 1032 stores subscriber data regarding MS 1002 in order to facilitate network functionality. SGSN 1032 may store subscription information such as, but not limited to, the IMSI, temporary identities, or PDP addresses. SGSN 1032 may also store location information such as, but not limited to, GGSN address for each GGSN 1034 where an active PDP exists. GGSN 1034 may implement a location register function to store subscriber data it receives from SGSN 1032 such as subscription or location information.

Serving gateway (S-GW) 1036 is an interface which provides connectivity between E-UTRAN 1018 and core network 1010. Functions of S-GW 1036 include, but are not limited to, packet routing, packet forwarding, transport level packet processing, or user plane mobility anchoring for inter-network mobility. PCRF 1038 uses information gathered from P-GW 1036, as well as other sources, to make applicable policy and charging decisions related to data flows, network resources or other network administration functions. PDN gateway (PDN-GW) 1040 may provide user-to-services connectivity functionality including, but not limited to, GPRS/EPC network anchoring, bearer session anchoring and control, or IP address allocation for PS domain connections.

HSS/HLR 1042 is a database for user information and stores subscription data regarding MS 1002 or UE 1024 for handling calls or data sessions. Networks may contain one HSS/HLR 1042 or more if additional resources are required. Example data stored by HSS 1042 include, but is not limited to, user identification, numbering or addressing information, security information, or location information. HSS/HLR 1042 may also provide call or session establishment procedures in both the PS and CS domains.

VLR/MSC Server 1028 provides user location functionality. When MS 1002 enters a new network location, it begins a registration procedure. A MSC server for that location transfers the location information to the VLR for the area. A VLR and MSC server may be located in the same computing environment, as is shown by VLR/MSC server 1028, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for MS 1002 registration or procedures for handover of MS 1002 to a different section of core network 1010. Gateway Mobile Services Switching Center (GMSC) server 1030 may serve as a connection to alternate GMSC servers for other MSs in larger networks.

Equipment Identity Register (EIR) 1044 is a logical element which may store the IMEI for MS 1002. User equipment may be classified as either "white listed" or "black listed" depending on its status in the network. If MS 1002 is stolen and put to use by an unauthorized user, it may be registered as "black listed" in EIR 1044, preventing its use on the network. A MME 1046 is a control node which may track MS 1002 or UE 1024 if the devices are idle. Additional functionality may include the ability of MME 1046 to contact idle MS 1002 or UE 1024 if retransmission of a previous session is required.

As described herein, a telecommunications system wherein management and control utilizing a software designed network (SDN) and an internet protocol are based, at least in part, on user equipment, may provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple Machine-to-Machine (M2M) and Internet of Things (IoT) sensors/devices—through enhanced wireless management.

While examples of a telecommunications system in which emergency data can be processed and managed have been described in connection with various computing devices/ processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

Data Analytics. In an aspect, PSAG 15 may provide a central point of data correlation on behalf of and among a plurality of public safety mobile applications and public safety mobile devices by collecting and storing relevant data. The data may, for example be stored in data lakes repository 42 as shown in FIG. 1. For the purposes of this disclosure, the exemplary embodiment of data repository 42 will be used, although it will be understood that the relevant data may also be stored in a cloud storage environment. For example, in an aspect, a plurality of cloud-resident PSAG data repositories would be accessible by carrier-resident big data analytics engines, and by PSE and enterprise customer premise-resident big data applications, where these data are targeted to PSAG data repositories. The data collected by PSAG 15 and stored in data repository 42 may be accessible by big data analytics engines.

Figure 9:
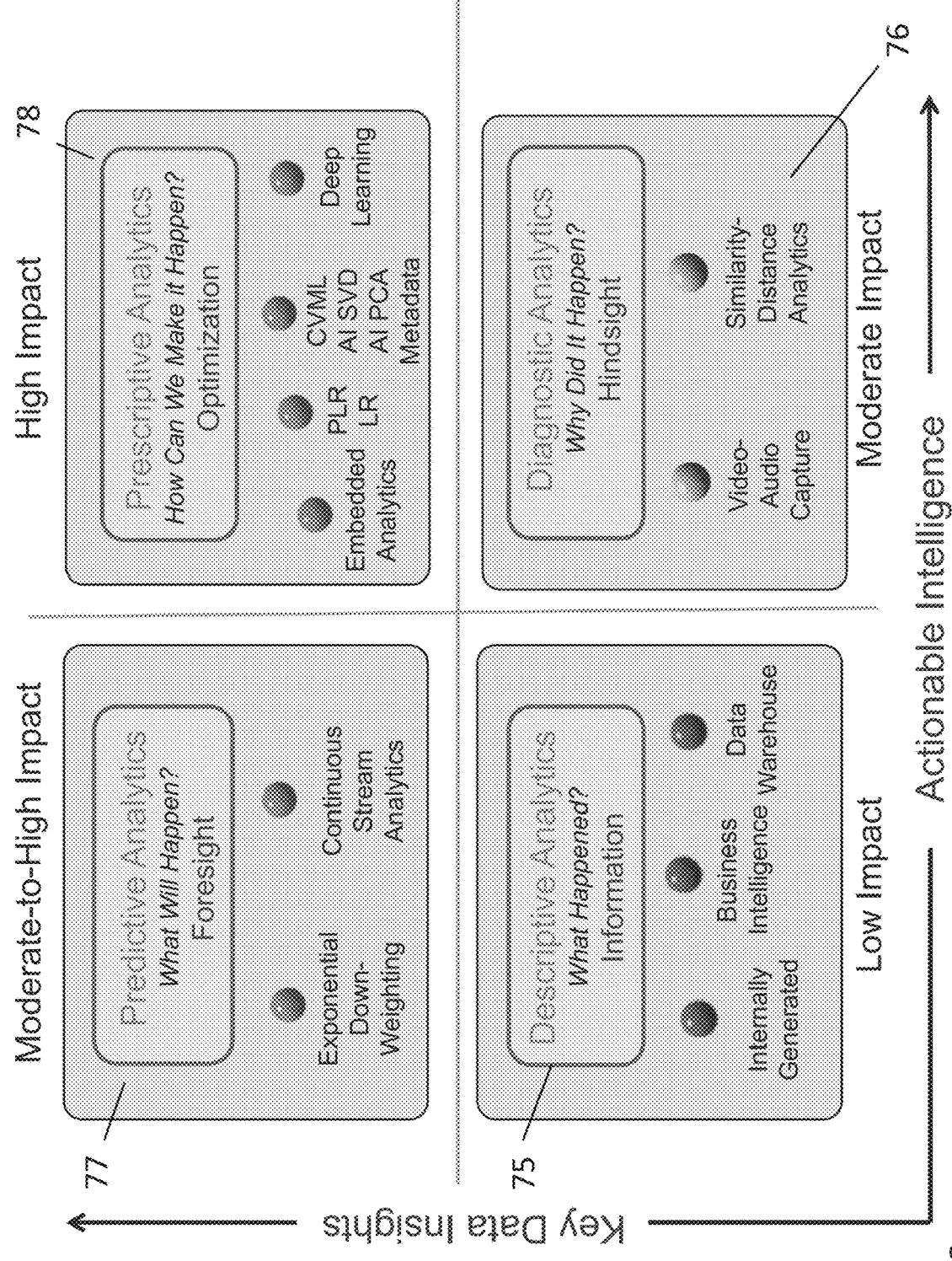
FIG. 9 is an exemplary graph highlighting big data analytics functionality as applied to the present disclosure.

With reference to FIG. 9, there is shown an exemplary example of how big data analytics may be used on the data collected by PSAG 15. There are shown four functional quadrants wherein the horizontal axis shows a continuum for actionable intelligence and the vertical axis shows a continuum for key data insights. Within the lower left quadrant, there is shown a functional box labeled descriptive analytics 75. Generally, descriptive analytics is based on past events and may, for example, be based on internally generated reports based on the collected data and other business intelligence. Descriptive analytics 75 may generally be directed to "what happened".

To analyze "why it happened" the lower right quadrant shows an exemplary diagnostic analytics function 76. Such a diagnostic analytics function may include, for example, the analysis of audio-video data captured during an event and similarity-distance analytics, where similarity-distance analytics is generally defined as the "closeness" and similarity of two or more events may also include references to other similar events that happen in the past so as to correlate the previous diagnostics with the current diagnostic analysis. As such, PSAG 15 may generate PSE- and Enterprise-originated diagnostic analytics that provide hindsight-based data insights into reasons for prior event occurrences.

Moving to the upper left quadrant in FIG. 9, there is shown the predictive analytics function 77. The predictive analytics function 77 is configured to predict what will happen based on the accumulated historical data and the artificial intelligence functions which may be resident in the PSAG 15. The predictive analytics function 77 may, for example, include exponential down-weighting which, in an aspect, may preferentially compress data into a single value that can be updated without having to save an entire dataset and in which more recently received data are weighted more than earlier-received data. This typically results in a down-weighting of older data, i.e., the data may decay over time. Additionally, continuous stream analytics provide the foundation for fast adaptive actions based on complex event processing and event stream processing, permitting data to be processed before it lands in a database. This predictive analytics function 77 may support much faster decision making than possible with traditional data analytics technologies such as descriptive analytics 75 and diagnostic analytics 76. In other words, the predictive analytics function 77 may constantly be calculating statistical analytics while managing and monitoring live streaming data. Such live streaming data may be pulled from a variety of sources by the PSAG 15 and may comprise data generated by the mobile applications, IoT-based field sensors, PSE communications, and other data being processed by network 14. Data may also include Global Positioning System (GPS) data from mobile devices, first responder vehicles, and location of emergency and/or other events.

Finally, with respect to the upper right quadrant of FIG. 9, there is shown a prescriptive analytics function 78 which may, for example, optimize future outcomes in emergency scenarios. The PSAG 15 prescriptive analytics elements function 78 may include, for example, embedded analytics in which analytic functions are integrated within various operational processes to improve the efficiency of those operational processes. The prescriptive analytics elements function 78 may also include predictive linear regression (PLR) in which an outcome is predicted based on a change of one of the input variables in terms of numeric and categorical inputs (dependent, or response variable), and logistic regression (LR), in which a binary outcome may be predicted based on an analysis of the input variables, where a probability is predicted that an instance belongs to a specific category, for example, the probability that a forecasted hurricane will cause a specific level of damage. The PLR and LR elements may incorporate nearest-neighbor predictive algorithms (where 'nearness' is basic Euclidean distance with resultant utility in selecting non-duplicate variables, rescale variables, and orthogonalizable variables). By way of further example, prescriptive analytics elements function 78 may also include continuous variable machine logic (CVML) which may include, for example, other statistical based functions including AI-based singular value decomposition (SVD), AI-based principal component analysis (PCA), and metadata. CVML may also include predictive linear regression. Deep learning functionality in which a cascade of processing layers may be analyzed layer by layer may also be used in the prescriptive analytics elements function 78. It will be understood that these functions are exemplary only and other statistical methods and functionality may be used to implement the prescriptive analytics function 78.

Figure 10A:
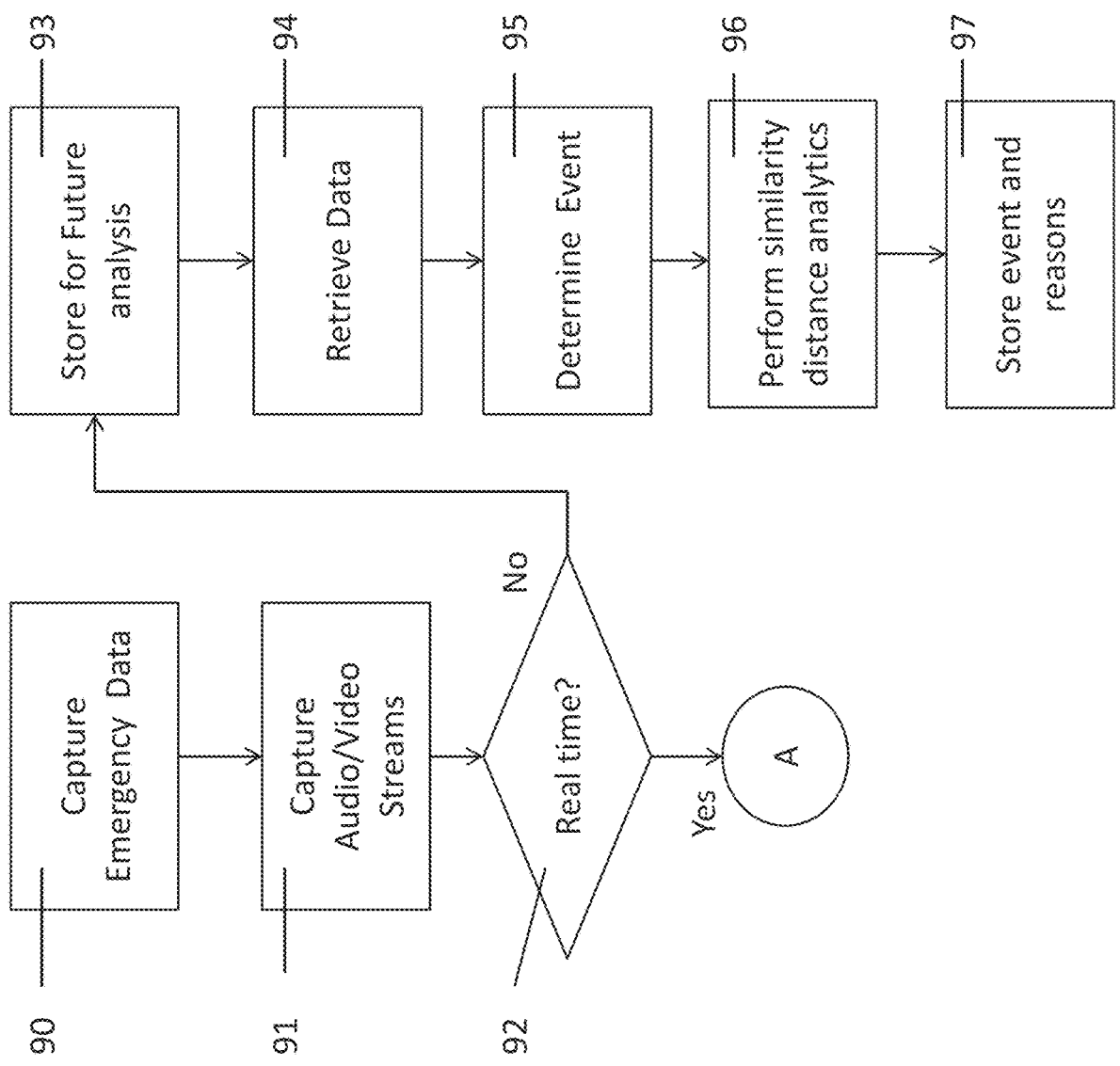
FIG. 10a is an exemplary flow diagram illustrating a method of analyzing emergency data.

With reference to FIG. 10a, there is shown an exemplary flow diagram of processing of emergency data that may be performed off-line or in non-real time. Such processing may typically be associated with the descriptive analytics function 75 to determine what event actually happened, for example, a traffic accident on Route 250 in West Virginia requiring an ambulance call or a hurricane battering the coast of North Carolina requiring the mobilization of various first responders and agencies. This non-real time processing may also be associated with the diagnostic analytics 76 to determine why the event happened, for example, running a red light in the case of the traffic accident or in the case of the hurricane, looking at the events in retrospect to determine why the emergency response was at it was.

The process starts at 90 which involves the capture of emergency data by the PSAG 15. At 91, any available audio and video streams are captured. At 92, the determination is made as to whether the analytics need to be performed in real time or may be performed off-line in non-real time. This decision may be made based on the purpose of the analytics. If the analytics to be performed is meant to analyze the emergency response and to make systemic improvement recommendations, for example, then the analytics may be performed in non-real time. If the analytics to be performed is to continually monitor and assess an ongoing emergency situation, then the analytics may be performed in real time. In this instance, it should be understood that real time includes near real time to allow for the acquisition of processing of incoming data without, however, the storage and subsequent retrieval of the data. If the processing may be performed non-real time, then the data is stored for future analysis at 93. At 94, the data is subsequently retrieved for analysis. The timing of such analysis may vary and may, for example, be performed periodically, at the conclusion of an emergency event, upon command of a carrier or a PSE, or on any other schedule in which processing resources may be available to perform the analytics.

At 95, the event is determined. The event determination may, for example, be a result of analysis of a 911 call or the analysis of sensor data retrieved during an emergency event. The event determination may also, for example, be determined based on extrinsic evidentiary data such as a police report or a weather report. This analysis is the descriptive analysis function 75. At 96, diagnostic analysis may optionally be performed to determine why the event happened. For example, the event may be compared to historical event data using the afore-mentioned similarity-distance analysis. The event may also be diagnosed based on an analysis of the audio and or video captured and which may be supplemented by sensor data recorded during the event. For example, running the red light in the traffic accident example above may include an analysis of the video to determine which of one or more vehicles were involved in an accident, sensor data from the vehicle to determine speed, acceleration/deceleration, distance and direction and sensor data from the traffic light to determine the timing of the change of the signal from green to yellow to red. In any event, the diagnosis is not confined to any one particular method but rather may be adapted depending on the type of emergency.

In the example of the hurricane, the event may be analyzed/diagnosed not based on the event itself, but rather based on the response to the event. For example, data may have been retrieved during the hurricane from a server hosted by the National Weather Service which would include, for example, rainfall amounts, wind speed and direction, reports of destruction, and other data, all time-stamped based on the occurrence of the event or the receipt of the data by the server. These data may then be analyzed in view of communications between PSEs and first responders and sensor data showing the location, speed and direction of movement of various emergency vehicles. As will be understood, other data may also be used to analyze the response to the hurricane event, including data captured by various network servers.

Figure 10B:
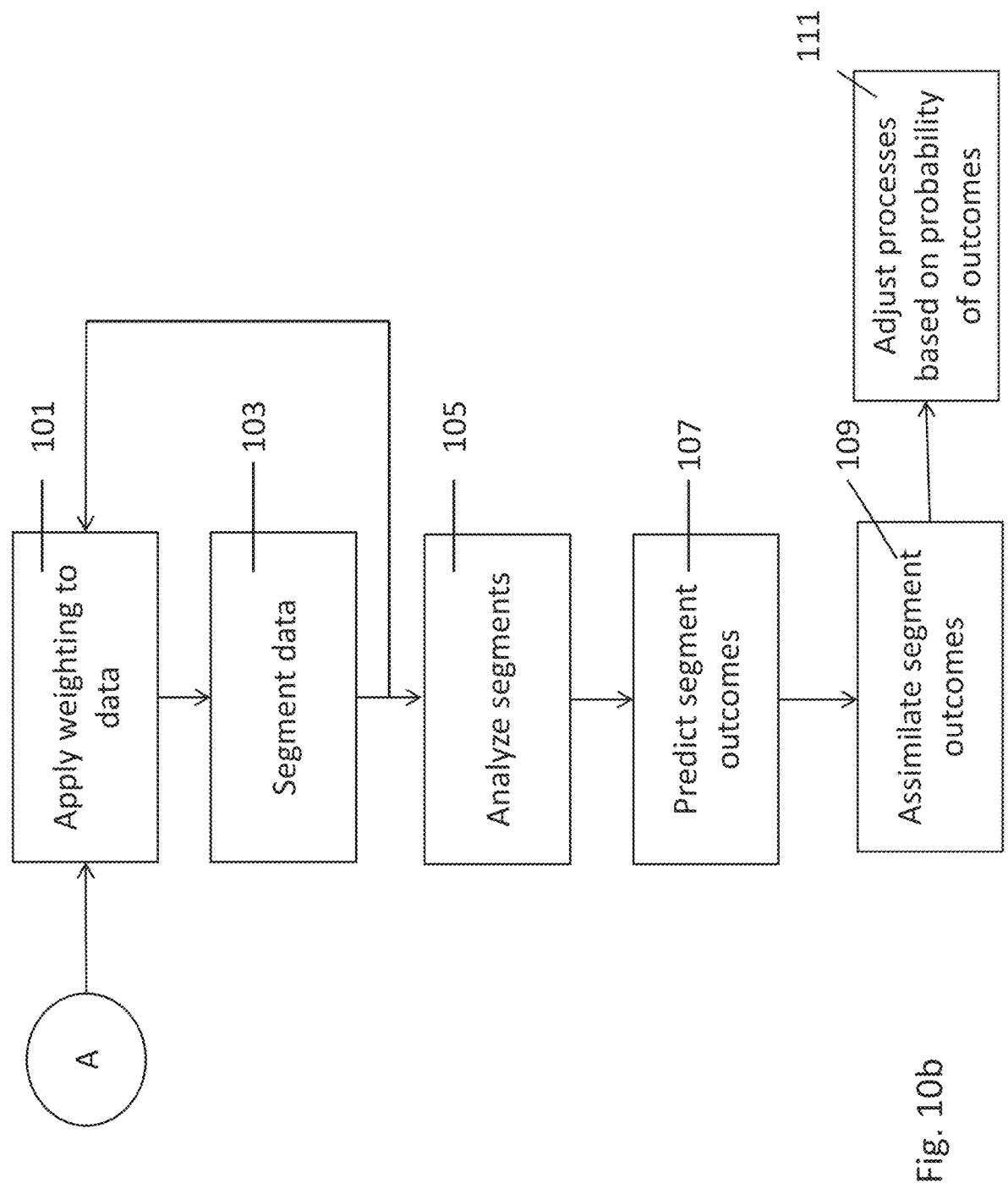

If the data are to be analyzed in real time, the process continues at point A in FIG. 10b. In this situation, the AI engine 60 and data analytics engine 65 within PSAG 15 may provide the processing analytics in order to analyze the data in real time or near real time using continuous streaming analytics or other processing methods. This may, for example, result in analyses that predicts future events based on one or multiple inputs and an historical understanding and statistical analysis of events. At 101, the data may be weighted which may, for example, assign a lower weight to aging data and a higher weight to more recent data. At 103, the data may be segmented based on time, source, relevance, weight assigned, or any other factor. Once segmented, the weighting function may be reapplies such that the data is weighed based on the significance of the segment to the particular analysis being performed. For example, data associated with the movement of ambulances and hospital capacity that has been segmented may be given a higher weight than the public comments of officials. At 105, the segments are analyzed using techniques which may, for example, include continuous stream analytics. At 107, segment outcomes may be predicted and may, for example, also be assigned a probability, which outcomes are then assimilated at 109. At 111, the processes may be adjusted based on the probability of outcomes. For example, if the data analytics shows that a hospital has reached capacity or that a major route to that hospital has been rendered impassable, then the system processes may be adjusted in near real time to inform the first responders to proceed to an alternative hospital, even if that alternative hospital is further from the current location. In this manner, reactive adjustments to the input stream of data captured by the PSAG 15 may be made quickly and efficiently.

With reference to FIG. 11, there is shown an exemplary flow diagram illustrating the use of prescriptive analytics. At 113, a processor, for example, a processor in a PSAG 15, may access stored data from a PSE and/or enterprise and/or first responder communications. From that step, there may be parallel calculations. At 123, real time data are being captured and monitored. At 125, external business or operational systems may be accessed and which may, for example, include output from statistical modeling of the stored data from 115. At 127, embedded analytics may be performed on the data being collected in real time. Embedded analytics may, for example, include the integration of external business analysis or operational systems such as emergency response systems associated with, for example, location, availability, presence, dispatch, and other tools used by PSE and first responders with the flow of real time emergency data. Additional data from external servers including, for example, weather services, are also combined to optimize the predictive analytic outcomes based on the real time data.

In a parallel path, the stored PSE, Enterprise and/or first responder data may be statistically modelled at 115, including, for example, regression analytics such as predictive linear regression and logistic regression analysis. At 117, analytics based on continuous variable logic analysis may be performed. This analysis, for example, may predict the severity of a storm on a continuum of non-destructive to highly destructive based on historical data analysis. At 119 the real time embedded analytics described above may be combined with the analytics based on stored historical data to optimize outcomes. Because the processes may involve deep learning analytics, the process is repeated at 115 wherein the optimized results are used for further processing within each loop of the process.

Reliability, Availability and Latency. In accordance with the present disclosure, the prescriptive analytics function 78 may be used to increase the reliability and availability of networks and reduce the latency associated with use of such. The PSAG 15 predictive and prescriptive analytics elements described above may proactively and dynamically respond to mobile network access latency and throughput degradations. While the disclosure will be described with respect to the PSAG 15, it will be understood that other network elements may monitor and process the mobile network access latency and perform the throughput analysis.

Figure 12:
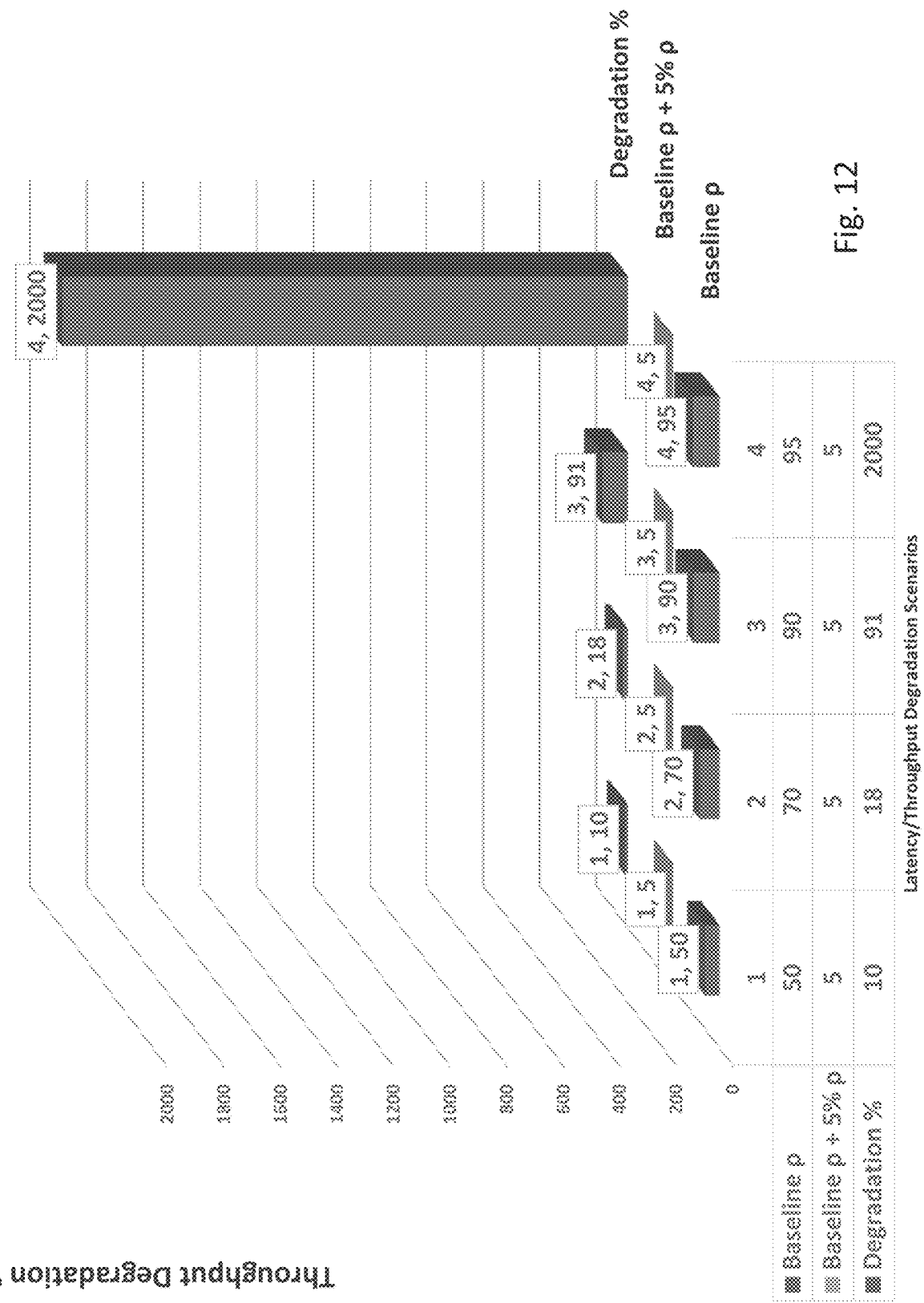
FIG. 12 is a graphical representation of an analysis of the throughput and latency impacts of additional network loading on a network.

With reference to FIG. 12, there is shown a graph which illustrates the effect of a 5% utilization increase over a baseline set of network utilization percentages, in this example, 50%, 70%, 90%, and 95% baseline utilizations. In this example, utilization ($\rho$) is preferentially sustained utilization (percent busy) of a plurality of one-to-n, n-to-one, or n-to-n target facility system/operating environments, which may, for example, include application servers, edge systems, intermediate systems, terrestrial links, celestial links, associated network elements, target backend systems, operating environments, and/or applications. As shown in the graph, an increase (degradation) of 5% from 50% baseline utilization generates a further 10% degradation of throughput, an increase (degradation) of 5% from 70% baseline utilization generates a further 18% degradation of throughput, an increase (degradation) of 5% from 90% utilization generates a further 91% degradation of throughput, and an increase (degradation) of 5% from 95% utilization generates a 2000% further degradation in utilization. In these examples, increasingly pronounced throughput degradations resulting from increasing utilization ($\rho$) by 5% from successively higher baseline utilization levels (i.e., 50%, 70%, 90%, 95%) also adversely impact network access latency, throughput, response time, and availability profiles.

For the purposes of this example, a single-stage, single-server queueing system is assumed. Servers may include a plurality of network elements including for example, application servers, edge systems, intermediate systems, terrestrial links, celestial links, associated network elements, target backend systems, operating environments, and/or applications. The expected service time [E(ts)] is expected time in server (Facility). Expected number of information units per unit of time [E(n)/T)] is calculated as expected traffic load presented to the Facility, including individual, sub-aggregated elements, and aggregated elements), expressed as expected number of information units (bits, bytes, blocks), [E(n)] over a unit of time (seconds, minutes, hours). The assumption is further made that the Facility utilization ($\rho$) is sustained, not sporadic and wherein sustained facility $\rho=[E(n)/T \times E(ts)]$ is a sensitive predictor to wait time in queue and is expressed as percent busy. The expected wait time in queue $[E(tw)]=\rho \times E(ts)/1\rho$, where [E(tw)] predicts expected total time in queueing system. Finally, expected total time in queueing system [E(tq)]=E (ts)+E(tw)], where expected total time in queueing system=facility expected service time+expected wait time in queue.

Alternatively, PSAG 15 can forward-project degradation in a plurality of application servers, edge systems, intermediate systems, terrestrial links, celestial links, associated network elements, target backend systems, operating environments, and/or applications as a function of increases (degradations) in sporadic utilization ($\rho$).

While the simple case of single-stage single-server queueing model is assumed herein, network facility utilization and resultant delays may also be derived for example, based on Markovian/exponential (M)/M/n queueing systems, G/M/n queueing systems (m-server systems, embedded Markov chain), First Come First Served (FCFS) queueing systems, Priority Queueing systems, Weighted Fair Queueing (WFQ), flow-based and class-based systems, Modified Weighted Round Robin (MWRR) queueing systems, and Modified Deficit Round Robin (MDRR) queueing systems.

With the sensitivity to increased network load based on existing network loading, predictive analytics 77 and prescriptive analytics 78 may be used to minimize network latency and response time, maximize network throughput and availability, and optimize end-to-end mobile network application access and communication in the case of an emergency situation or an event. For example, the PSAG 15 may dynamically interface with the operations support system (OSS) and other network operations to monitor in near real time to communicate facility loading. This monitoring may be performed at pre-set intervals by time or may be triggered by facility loading thresholds being exceeded. As such, the PSAG may proactively modify logical topologies and network resource allocations to maintain latency below a certain threshold and maintain sufficiently high throughput and Quality of Service (QoS), and QoS, Priority and Preemption (QPP) for PSEs and first responders, where proactive modification of logical topologies and network resource allocations may include for example, modification of VNF 102 resources within a Software Defined Network (SDN) environment. In this way, PSAG 15 detection of near-real-time or projection of near-term KPI threshold-exceeding network (aggregate and/or element) utilization ($\rho$), which in turn, adversely impacts access latency, throughput, response time, and availability, and proactively resets topologies through an SDN process at VNF 102 for example, in order to ensure optimized network access latency, throughput, response time, and availability on behalf of public safety first responders. Priority, Preemption, and QoS have been defined in the 3rd Generation Partnership Project (3GPP) since Release 8 (www3gpp.org). QoS mechanisms include for example, Multimedia Priority Services (MPS) identifier, MPS priority, QoS Class Identifier (QCI), Maximum Bit Rate (MBR), Guaranteed Bit Rate (GBR), Differentiated Services Code Point (DSCP), traffic flow, Allocation and Retention Priority (ARP), Access Class (AC), Multi-Access Point Name (APN) support, priority signaling and processing, overload exemption, priority queueing, reservation priority, priority bearer preemption, and priority bearer modification.

In an embodiment, public safety first responder key performance indicators (KPIs)—for example ARP, QCI, AC, MBR, DSCP—may be pre-set to ensure highest priority access and priority retention relative to non-public safety users potentially or actually occupying a shared mobile network and network application environment to the extent that non-public safety first responder users and traffic may be preemptively withheld or dropped from the mobile network and network application environment to the extent to which non-public safety network traffic baseline sustained and/or sporadic utilization (ρ) levels are determined in advance via PSAG predictive analytics 77 or prescriptive analytics 78 to be approaching pre-set trigger thresholds.

In an embodiment, public safety first responder key performance indicators (KPIs)—for example ARP, QCI, AC, MBR, DSCP—may be pre-set to ensure highest priority access and priority retention relative to non-public safety users occupying a given mobile network and network application environment to the extent that non-public safety first responder users and traffic may be preemptively withheld or dropped from the mobile network and network application environment to the extent to which non-public safety network traffic baseline sustained and/or sporadic utilization (ρ) levels are determined in advance via PSAG predictive analytics 77 or prescriptive analytics 78 to be approaching trigger thresholds as a function of PSAG AI Engine 60 and/or PSAG Recommendation Engine 66 elements.

In an embodiment, public safety first responder key performance indicators (KPIs)—for example ARP, QCI, AC, MBR, DSCP—may be pre-set to ensure highest priority access and priority retention relative to non-public safety users occupying a given mobile network and network application environment. Upon PSAG-detected or PSAG-projected via predictive analytics 77 or prescriptive analytics 78 that network traffic baseline sustained and/or sporadic utilization (ρ) levels are determined to be approaching trigger thresholds as a function of PSAG AI Engine 60 and/or PSAG Recommendation Engine 66 elements, a new instance of SDN-mediated set of Virtual Network Functions (VNFs), Virtual Machines (VM), and related virtual, cloud-based resources may be instantiated on-demand in order to ensure Public Safety first responders with sufficiently low access latency and response time, high throughput and availability, and high target application resource access and interaction, while at the same time not requiring preemption of preemptive dropping of non-Public Safety users from network resources.

In an embodiment, the PSAG 15 may also dynamically monitor and maintain sustained and/or sporadic ρ values through deep learning as part of its prescriptive analytics function 78 and dynamically modify network topology and resource allocations accordingly to ensure QoS/QPP parameters are maintained for PSEs and first responders.

In an embodiment, the predictive analytics function 77 and prescriptive analytics function 78 may be used to predict the occurrence of emergency events and to modify network topology and resource allocations in anticipation of increased utilization based on the predicted emergency events. For example, if continuous stream analytics shows that an emergency is occurring in a geographic area, normal or routine communications traffic in that area may be shifted to another geographic location in real time or near-real time to lower the sustained utilization in the geographic area associated with the emergency in anticipation of the increased utilization by PSEs and first responders.

Figure 13:
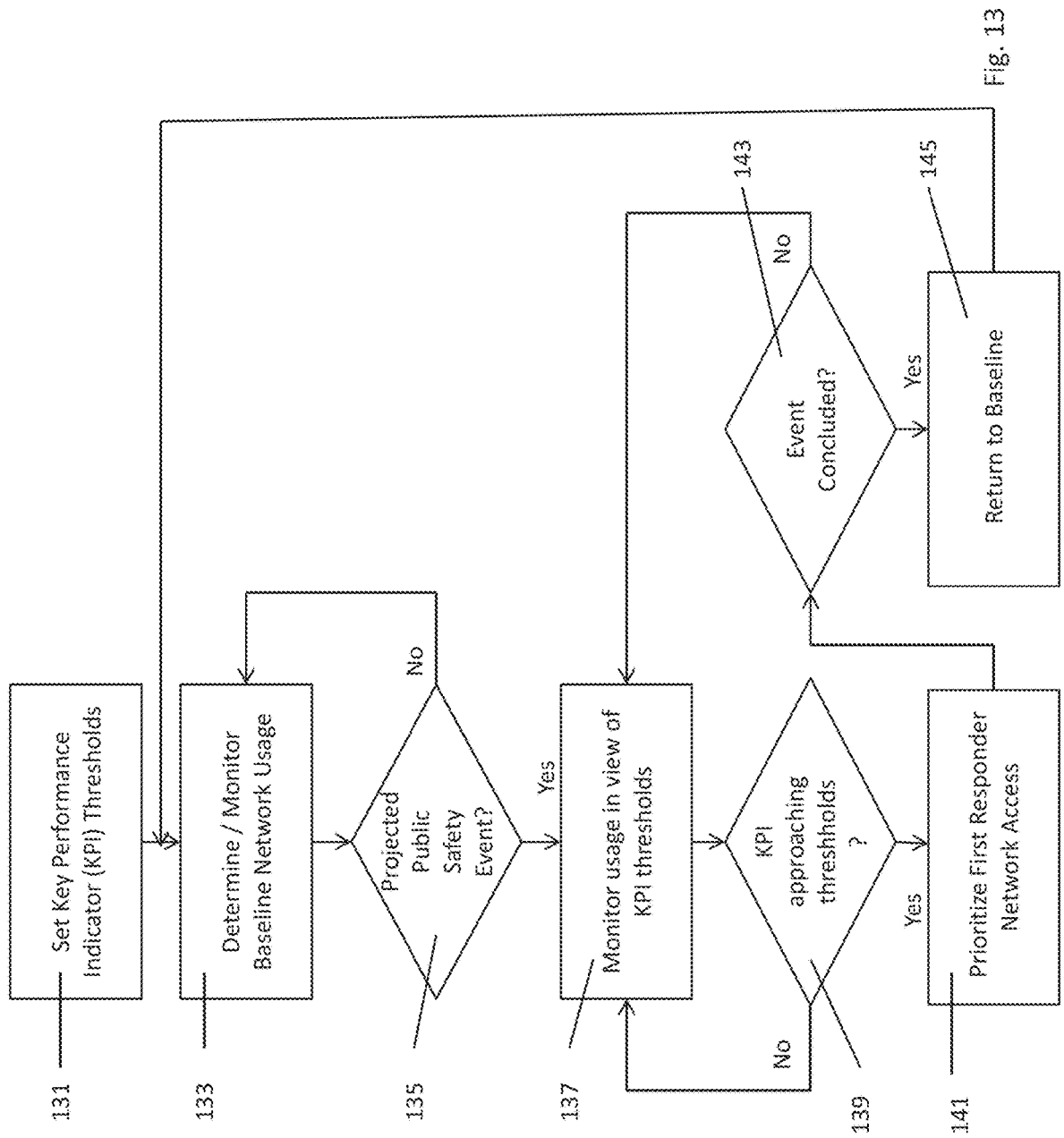
FIG. 13 is an exemplary flow diagram illustrating a method of predicting and measuring latency and throughput, and maintaining acceptable levels of latency in a network.

With reference to FIG. 13, there is shown a flow diagram of an exemplary method for modifying network resources based on predictive analytics. The method may, for example, be performed in PSAG 15 or may, in an aspect, be performed by an eNodeB or other network elements. At 131, key performance indicator (KPI) thresholds are set. At 133, the baseline network utilization (ρ) is determined. At decision block 135, it is determined whether predictive analytics are projecting a safety event. For example, the predictive analytics using weather data from an external server and data analytics may project moderate to severe impact in southeastern Florida. The event may be imminent or it may be predicted 24 hours in advance. If there is no projected event, the process continues at 133 where the baseline network utilization is monitored. If there is a projected event, the process continues at 137 where the network usage is monitored in view of the previously set KPI thresholds. At 139, the KPI measurements are compared to the thresholds to determine it the KPIs are approaching the thresholds. In the hurricane example, the KPIs may not be approaching the thresholds for the event projected 24 hours in advance, but as the event comes closer, then the KPIs may be affected and start approaching the thresholds. If the KPIs are not yet approaching the thresholds, then the monitoring of network usage continues at 137. If the KPIs are approaching the thresholds, then network access for PSEs and first responders may be prioritized at 141. At 143, if the event has not yet concluded, the process continues at 137 wherein the KPIs are monitored in view of the newly prioritized network access and if necessary, further prioritization is performed at 141 as the KPIs approach the thresholds again. If the event is concluded at 135, the network allocations are returned to the baseline and that baseline may once again be monitored at 133.

With respect to 141, the prioritization of network resources may occur in a variety of ways. For example, PSE and first responder network access may simply be given a higher priority which may, for example, be include traffic on a dedicated frequency band wherein non-emergency traffic is moved off of the dedicated frequency band. In an aspect, the non-emergency traffic may be moved to resources in a different geographic area which may increase latency of that non-emergency traffic, but otherwise may provide both availability and improved latency to emergency traffic. In the hurricane example, non-emergency traffic may be moved to Texas from Florida, freeing up the local Florida resources for emergency traffic. In another aspect, in a SDN, additional VMs may be deployed with additional instantiations of the required network functions to provide those additional network resources on demand. It will be understood that other ways of prioritization may be included and fall within the scope of this disclosure and the appended claims.

Additional Material. The disclosure includes a method comprising accessing, by a processor, data associated with a first emergency event, evaluating, by the processor, the data to determine a response to the emergency event by performing similarity-distance analysis with data associated with a previous historical emergency event, weighting, by the processor the data such that data associated with the first emergency event is weighted more than the data associated with the previous emergency event to determine weighted historical event data, analyzing, by the processor, continuous streaming of current data in real time or near real time associated with first responder user devices, and optimizing, by the processor, predictions of an upcoming emergency event based on the analyzing step and the weighted historical event data. Additionally, the method includes wherein the analyzing step includes statistical analysis of the current data which may, for example, include regression analysis.

The method may include wherein the current data is generated from one or more of mobile applications, interne of things field sensors, public safety enterprise communications, location of first responder user devices, location of first responder vehicles, and location of an upcoming emergency event. The optimizing step may include continuous variable machine logic analysis of the current data in view of the weighted historical event data and may further include the step of prioritizing network access for first responder communications based on the optimizing step, wherein the prioritizing step comprises allocating local network resources to first responders in a geographic area of the third emergency event and allocating non-first responder communications to remote resources relative to the geographic area. In an aspect, the prioritizing step comprises wherein instantiating a new set of SDN-mediated Virtual Network Functions (VNFs) and Virtual Machines (VMs).

The disclosure is also directed to an apparatus comprising an input-output interface, a processor coupled to the input-output interface and wherein the processor is coupled to a memory, the memory having stored thereon executable instructions that when executed by the processor cause the processor to effectuate operations comprising accessing, by a processor, data associated with a first emergency event, evaluating, by the processor, the data to determine a response to the emergency event by performing similarity-distance analysis with data associated with a previous historical emergency event, weighting, by the processor the data such that data associated with the first emergency event is weighted more than the data associated with the previous emergency event to determine weighted historical event data, analyzing, by the processor, continuous streaming of current data in real time or near real time associated with first responder user device, and optimizing, by the processor, predictions of an upcoming emergency event based on the analyzing step and the weighted historical event data. The analyzing step may include statistical analysis, including regression analysis, of the current data. The current data may be generated from one or more of mobile applications, internet of things field sensors, public safety enterprise communications, location of first responder user devices, location of first responder vehicles, and location of an upcoming emergency event. The optimizing step may include continuous variable machine logic analysis of the current data in view of the weighted historical event data. The operations may further include prioritizing network access for first responder communications based on the optimizing step wherein the prioritizing step comprises allocating local network resources to first responders in a geographic area of the third emergency event and allocating non-first responder communications to remote resources relative to the geographic area or wherein the prioritizing step includes instantiating a new set of SDN-mediated Virtual Network Functions (VNFs) and Virtual Machines (VMs).

In an aspect, the disclosure is directed to a method comprising receiving, by a processor, emergency data and non-emergency data; discerning, by the processor, the emergency data from the non-emergency data, forwarding to a gateway by the processor, both the emergency data and the non-emergency data, analyzing, by the processor, the emergency data in real time or near real time in view of historical emergency data; and predicting in part, by the processor, an upcoming emergency event based on the analyzing step. The method may further include prioritizing network access for first responder communications based on the predicting step and wherein the prioritizing step comprises allocating local network resources to first responders in a geographic area of the third emergency event and allocating non-first responder communications to remote resources relative to the geographic area or wherein the prioritizing step comprises wherein instantiating a new set of SDN-mediated Virtual Network Functions (VNFs) and Virtual Machines (VMs).

The disclosure is also directed to a method comprising setting key performance indicator thresholds for use of a network by public safety first responder devices, determining a baseline network usage profile, projecting a public safety event, monitoring the key performance indicators in view of the baseline network usage profile and prioritizing network resource allocations for the first responder devices over network resource allocations for non-first responder based on the monitoring step. The method may further include estimating the effect of a projected public safety event on network usage and wherein the prioritizing step is based on the estimating step. The prioritizing step may include allocating network resources during the public safety event in a geographic area near the public safety event and allocating resources for non-first responder network access to a different geographic area or proactively modifying logical topologies and network resource allocations to maintain latency below a latency threshold and to maintain throughput above a throughput threshold. The key performance indicators may be one of Quality of Service (QoS), and QoS, Priority and Preemption (QPP) for public safety enterprises and first responders. Alternatively, the key performance indicators may be one of allocation and retention priority, access class, maximum bit rate, quality of service class identifier, and differentiated services code point. The network facility usage determination may be based on one of a plurality of queueing models wherein the one of a plurality of queueing models is one of a single stage single service model, a Markovian/exponential queueing model, a first come first served queueing model, a priority queueing model, a weighted fair queueing model, a modified weighted round robin queueing model and a modified deficit round robin queueing model. In an aspect, the monitoring step is performed periodically independently of the projecting step. The method may further include estimating the effect of a projected public safety event on network usage and wherein the prioritizing step is based on the estimating step. The monitoring step may be triggered based on projecting step.

In an aspect, the method may further include detecting the public safety event and the monitoring step is triggered based on the detecting step. In an aspect, the projecting step may be based on one of predictive analytics and prescriptive analytics. The network may be a software defined network (SDN) and the prioritization step comprises instantiating a new set of SDN-mediated Virtual Network Functions (VNFs) and Virtual Machines (VMs). The method described above may be performed by one of a radio access network element and a public safety analytics gateway.

The disclosure is also directed to an apparatus including an input-output interface, a processor coupled to the input-output interface and wherein the processor is coupled to a memory, the memory having stored thereon executable instructions that when executed by the processor cause the processor to effectuate operations including setting key performance indicator thresholds for use of a network by public safety first responder devices, determining a baseline network usage profile, projecting a public safety event, monitoring the key performance indicators in view of the baseline network usage profile, and prioritizing network resource allocations for the first responder devices over network resource allocations for non-first responder based on the monitoring step. The operations may further include estimating the effect of the projected public safety event on network usage and wherein the prioritizing step is based on the estimating step and may yet further include detecting a public safety event and the monitoring step is performed based on the detecting step.

In an aspect, the network may be a software defined network (SDN) and the prioritization step comprises instantiating a new set of SDN-mediated Virtual Network Functions (VNFs) and Virtual Machines (VMs).

It will be apparent to those skilled in the art that various modifications and variations may be made in the present disclosure without departing from the scope or spirit of the disclosure. Other aspects of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   accessing, by a public safety analytics gateway having an artificial intelligence engine, first data associated with a first emergency event;
   evaluating, by the public safety analytics gateway, the first data to determine a response to the first emergency event by performing similarity-distance analysis with other data associated with a previous historical emergency event;
   weighting, by the public service analytics gateway, the first data and the other data such that the first data associated with a first emergency event is weighted more than the other data associated with the previous emergency event to determine weighted historical event data;
   analyzing, by the public safety analytics gateway, continuous streaming of current data in real time or near real time associated with first responder user devices using streaming analytics functionality of the artificial intelligence engine;
   and optimizing, by the public service analytics gateway, a response to a current event based on the analyzing step and the weighted historical event data.

2. The method of claim 1 wherein the analyzing step includes statistical analysis of the current data wherein the statistical analysis comprises regression analysis.

3. The method of claim 1 wherein the current data is generated from at least one of mobile applications, internet of things field sensors, public safety enterprise communications, location of first responder user devices, location of first responder vehicles, and location of an upcoming emergency event.

4. The method of claim 1 wherein the optimizing step comprises continuous variable machine logic analysis of the current data in view of the weighted historical event data.

5. The method of claim 4 further comprising prioritizing network access for first responder communications based on the optimizing step.

6. The method of claim 5 wherein the prioritizing step comprises allocating local network resources to first responders in a geographic area of the third emergency event and allocating non-first responder communications to remote resources relative to the geographic area.

7. The method of claim 6 wherein the prioritizing step comprises wherein instantiating a new set of SDN-mediated Virtual Network Functions (VNFs) and Virtual Machines (VMs).

8. An apparatus comprising:
   an input-output interface;
   a public safety analytics gateway having an artificial intelligence engine coupled to the input-output interface wherein the processor is coupled to a memory, the memory having stored thereon executable instructions that when executed by the public safety analytics gateway cause the processor to effectuate operations comprising:
   accessing data associated with emergency events;
   weighting the data such that data associated with a recent emergency event is weighted more than data associated with a previous emergency event to determine weighted historical event data;
   analyzing continuous streaming of current data using continuous streaming functionality in real time or near real time at the current data is received by the public safety analytics gateway associated with first responder user devices;
   and optimizing a response to a current event based on the analyzing step and the weighted historical event data.

9. The apparatus of claim 8 wherein the analyzing step comprises statistical analysis, wherein the statistical analysis comprises regression analysis of the current data.

10. The apparatus of claim 9 wherein the current data comprises data from at least one of mobile applications, internet of things field sensors, public safety enterprise communications, location of first responder user devices, location of first responder vehicles, and location of an upcoming emergency event.

11. The apparatus of claim 8 wherein the predicting step comprises continuous variable machine logic analysis of the current data in view of the weighted historical event data.

12. The apparatus of claim 8 further comprising prioritizing network access for first responder communications based on the predicting step.

13. The apparatus of claim 12 wherein the prioritizing step comprises allocating local network resources to first responders in a geographic area of the third emergency event and allocating non-first responder communications to remote resources relative to the geographic area.

14. The apparatus of claim 12 wherein the prioritizing step comprises instantiating a new set of SDN-mediated Virtual Network Functions (VNFs) and Virtual Machines (VMs).

* * * * *